(12) United States Patent
Shimizu et al.

(10) Patent No.: US 11,165,100 B2
(45) Date of Patent: Nov. 2, 2021

(54) SOLID BATTERY, BATTERY PACK, VEHICLE, POWER STORAGE SYSTEM, POWER TOOL, AND ELECTRONIC DEVICE

(71) Applicant: Murata Manufacturing Co., Ltd., Nagaokakyo (JP)

(72) Inventors: Keisuke Shimizu, Nagaokakyo (JP); Tomohiro Kato, Nagaokakyo (JP); Masamitsu Suzuki, Nagaokakyo (JP); Noriyuki Aoki, Nagaokakyo (JP); Masahiro Morooka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 6 days.

(21) Appl. No.: 16/386,898

(22) Filed: Apr. 17, 2019

(65) Prior Publication Data

US 2019/0252727 A1   Aug. 15, 2019

Related U.S. Application Data

(63) Continuation of application No. PCT/JP2017/029591, filed on Aug. 18, 2017.

(30) Foreign Application Priority Data

Nov. 16, 2016   (JP) .............................. JP2016-223542

(51) Int. Cl.
*H01M 10/0585* (2010.01)
*B60K 6/28* (2007.10)
(Continued)

(52) U.S. Cl.
CPC .......... *H01M 10/0585* (2013.01); *B60K 6/28* (2013.01); *B60L 50/64* (2019.02); *H01M 4/62* (2013.01);
(Continued)

(58) Field of Classification Search
CPC ......... H01M 10/0585; H01M 10/0562; H01M 10/46; H01M 10/0565; H01M 4/62;
(Continued)

(56) References Cited

U.S. PATENT DOCUMENTS

2009/0193648 A1   8/2009  Inda
2010/0003592 A1   1/2010  Baba
(Continued)

FOREIGN PATENT DOCUMENTS

JP   2009193728 A   8/2009
JP   2009206090 A   9/2009
(Continued)

OTHER PUBLICATIONS

Kim et al., "Fabrication of a high lithium ion conducting lithium borosilicate glass," Apr. 15, 2011, Journal of Non-Crystalline Solids, 357, 2863-2867. (Year: 2011).*

(Continued)

*Primary Examiner* — Ula C Ruddock
*Assistant Examiner* — Matthew W Van Oudenaren
(74) *Attorney, Agent, or Firm* — Arent Fox LLP

(57) ABSTRACT

A solid battery including a positive electrode layer; a negative electrode layer; a current collecting layer; a solid electrolyte layer; and an insulating layer. Each of the positive electrode layer, the negative electrode layer, the current collecting layer, the solid electrolyte layer, and the insulating layer contains a material having a glass transition point of 500° C. or less in an amount of 10 vol % to 60 vol %, and among contents of the material having a glass transition point of 500° C. or less in each of the positive electrode layer, the negative electrode layer, the current collecting layer, the solid electrolyte layer, and the insulating layer, a difference between a maximum content and a minimum content is 30 vol % or less.

9 Claims, 12 Drawing Sheets

(51) Int. Cl.
  *B60L 50/64* (2019.01)
  *H01M 10/46* (2006.01)
  *H01M 4/62* (2006.01)
  *H01M 4/66* (2006.01)
  *H02J 7/00* (2006.01)
  *H02J 7/34* (2006.01)
  *H01M 10/0562* (2010.01)
  *H01M 50/543* (2021.01)

(52) U.S. Cl.
  CPC ........... *H01M 4/628* (2013.01); *H01M 4/667* (2013.01); *H01M 10/0562* (2013.01); *H01M 10/46* (2013.01); *H01M 50/543* (2021.01); *H02J 7/0013* (2013.01); *H02J 7/34* (2013.01); *B60Y 2200/91* (2013.01); *B60Y 2200/92* (2013.01); *B60Y 2400/112* (2013.01)

(58) Field of Classification Search
  CPC ...... H01M 4/628; H01M 4/667; H01M 4/362; H01M 2/30; H01M 2300/0071; H01M 2300/0082; H02J 7/0013
  See application file for complete search history.

(56) References Cited

U.S. PATENT DOCUMENTS

| | | | | |
|---|---|---|---|---|
| 2011/0281152 | A1* | 11/2011 | He | H01M 4/13 429/159 |
| 2012/0251878 | A1* | 10/2012 | Ueki | H01M 10/052 429/211 |
| 2012/0268072 | A1* | 10/2012 | Okuno | H01M 2/1686 320/128 |
| 2014/0242333 | A1* | 8/2014 | Oono | B32B 7/12 428/141 |
| 2015/0037688 | A1 | 2/2015 | Otsuka | |
| 2015/0194680 | A1* | 7/2015 | Uchida | H01M 4/13 429/234 |
| 2016/0344032 | A1 | 11/2016 | Shibata | |

FOREIGN PATENT DOCUMENTS

| | | | |
|---|---|---|---|
| JP | 2013157195 | * | 8/2013 |
| JP | 2013157195 | A | 8/2013 |
| JP | 2013196968 | A | 9/2013 |
| JP | 2015032355 | A | 2/2015 |
| JP | 2015069842 | A | 4/2015 |
| JP | 2016031782 | A | 3/2016 |
| JP | 2016066584 | A | 4/2016 |
| JP | 2016192370 | A | 11/2016 |
| WO | 2008099468 | A1 | 8/2008 |
| WO | 2014170998 | A1 | 10/2014 |
| WO | WO2015170481 | * | 11/2015 |

OTHER PUBLICATIONS

International Search Report issued for PCT/JP2017/029591, dated Nov. 21, 2017.
Written Opinion of the International Searching Authority issued for PCT/JP2017/029591, dated Nov. 21, 2017.

* cited by examiner

1601

SOLID BATTERY, BATTERY PACK, VEHICLE, POWER STORAGE SYSTEM, POWER TOOL, AND ELECTRONIC DEVICE

CROSS REFERENCE TO RELATED APPLICATIONS

The present application is a continuation of International application No. PCT/JP2017/029591, filed Aug. 18, 2017, which claims priority to Japanese Patent Application No. 2016-223542, filed Nov. 16, 2016, the entire contents of each of which are incorporated herein by reference.

FIELD OF THE INVENTION

The present technology relates to a solid battery. More specifically, the present technology relates to a solid battery, a battery pack, a vehicle, a power storage system, a power tool, and an electronic device.

BACKGROUND OF THE INVENTION

In recent years, with the development of portable devices such as personal computers (PC) and mobile phones, there has been rapidly increasing demand for batteries. In addition, the spread of electric cars and the like has accelerated, and there is a growing need for batteries. Among the batteries, a solid battery using a solid electrolyte in place of a liquid electrolyte has been extensively researched and developed.

For example, there has been proposed a method of producing a lithium ion secondary battery, including the steps of: stacking an electrolyte green sheet and a positive electrode green sheet to form a laminated body; and firing the laminated body, where at least one of the electrolyte green sheet and the positive electrode green sheet contains an amorphous oxide glass powder in which lithium ion conductive crystals are deposited in the firing step (see Patent Document 1).

Further, for example, an all-solid battery formed by stacking at least a positive electrode layer, a solid electrolyte layer, and a negative electrode layer, where the positive electrode layer is made of only a positive electrode active material in which a specific crystal plane is oriented in a direction of lithium ion conduction, the negative electrode layer is made of a carbonaceous material, and the carbonaceous material occupies 70% or more of the volume of the negative electrode layer (see Patent Document 2).

Furthermore, for example, there has been proposed a method of producing a positive electrode active material layer-containing body having at least a positive electrode active material layer, including the steps of: preparing a positive electrode active material layer-forming material which contains a positive electrode active material and a solid electrolyte material and in which a ratio of the positive electrode active material to the total of the positive electrode active material and the solid electrolyte material is greater than 50 vol %, and an average particle size ratio of the positive electrode active material to the solid electrolyte material is 0.9 or more; and hot-pressing the positive electrode active material layer-forming material at a temperature equal to or more than a softening point of the solid electrolyte material to form a positive electrode active material layer-containing body (see Patent Document 3).

Patent Document 1: Japanese Patent Application Laid-Open No. 2009-206090

Patent Document 2: Japanese Patent Application Laid-Open No. 2015-32355

Patent Document 3: Japanese Patent Application Laid-Open No. 2013-196968

SUMMARY OF THE INVENTION

However, in the art, a solid battery having improved battery characteristics and reliability is now desired, rather than solid batteries based on the techniques proposed in Patent Documents 1 to 3.

Accordingly, the present technology has been made in view of such circumstances, and a main object of the present technology is to provide a solid battery having excellent battery characteristics and excellent reliability as well as a battery pack, a vehicle, a power storage system, a power tool, and an electronic device, which include the solid battery.

As a result of intensive research to solve the above-mentioned object, the present inventors have paid attention to the content of a material having a glass transition point of 500° C. or less in elements (e.g., a positive electrode layer, a negative electrode layer, a current collecting layer, a solid electrolyte layer or an insulating layer) which form a solid battery. Surprisingly, they have succeeded in remarkably improving battery characteristics and reliability, and completed the present technology.

That is, the present technology provides a solid battery that includes a positive electrode layer; a negative electrode layer; a current collecting layer; a solid electrolyte layer; and an insulating layer, where each of the positive electrode layer, the negative electrode layer, the current collecting layer, the solid electrolyte layer, and the insulating layer contains a material having a glass transition point of 500° C. or less in an amount of 10 vol % to 60 vol %, and among the contents of the material having a glass transition point of 500° C. or less in each of the positive electrode layer, the negative electrode layer, the current collecting layer, the solid electrolyte layer, and the insulating layer, a difference between a maximum content and a minimum content is 30 vol % or less.

Further, the present technology provides a solid battery that includes a positive electrode layer; a negative electrode layer; a current collecting layer; a solid electrolyte layer; and an insulating layer, where the solid electrolyte layer is made of a first material having a glass transition point of 500° C. or less, each of the positive electrode layer, the negative electrode layer, the current collecting layer, and the insulating layer contains a second material having a glass transition point of 500° C. or less in an amount of 10 vol % to 60 vol %, and among contents of the second material, a difference between a maximum content and a minimum content is 30 vol % or less.

In the solid battery according to the present technology, the material having a glass transition point of 500° C. or less contained in at least the positive electrode layer and the negative electrode layer and the material having a glass transition point of 500° C. or less constituting the solid electrolyte layer may have an ionic conductivity of $10^{-7}$ S/cm or more.

The solid battery according to the present technology may further include a protective layer, and the protective layer may contain the material having a glass transition point of 500° C. or less.

The solid battery according to the present technology may further include a terminal layer, and the terminal layer may contain the material having a glass transition point of 500° C. or less.

Furthermore, the present technology provides the following:

a battery pack including: the solid battery according to the present technology; a control unit which controls a usage state of the solid battery; and a switch unit which switches the usage state of the solid battery in response to an instruction from the control unit;

a vehicle including: the solid battery according to the present technology; a driving force converting device which receives supply of electric power from the solid battery and converts the electric power into a driving force of the vehicle; a driving unit which drives in response to the driving force; and a vehicle control device;

a power storage system including: a power storage device which includes the solid battery according to the present technology; a power consumption device to which electric power is supplied from the solid battery; a control device which controls electric power supply from the solid battery to the power consumption device; and a power generation device which charges the solid battery;

a power tool including: the solid battery according to the present technology, and a movable part to which electric power is supplied from the solid battery; and an electronic device including the solid battery according to the present technology, the electronic device being configured to receive supply of electric power from the solid battery.

According to the present technology, the battery characteristics and reliability can be improved. The effects described herein are not necessarily limited, and may be any of the effects described in the present disclosure or may be effects different from those effects.

DETAILED DESCRIPTION OF THE INVENTION

Figure 1:
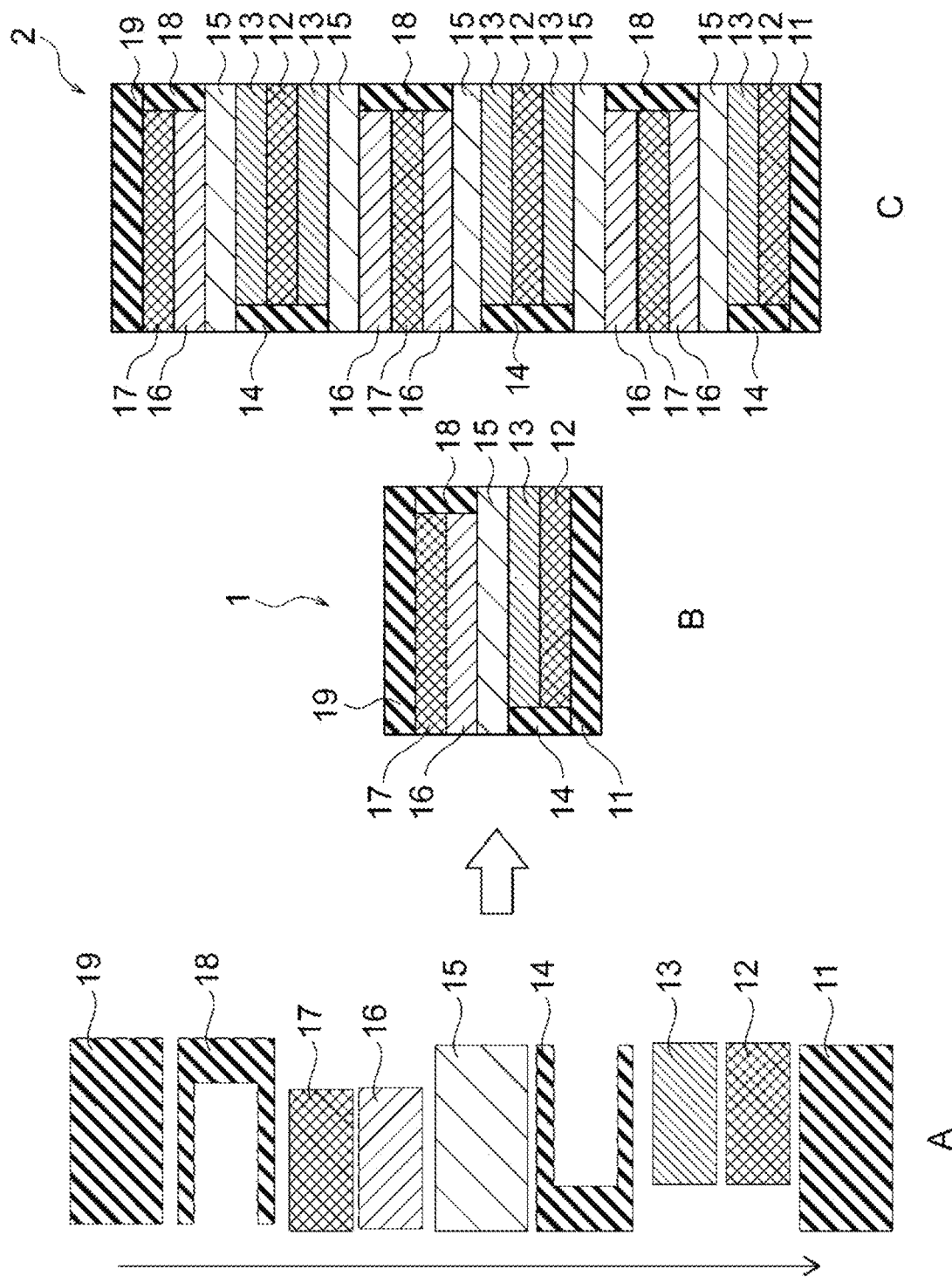
FIG. 1 is a diagram illustrating a configuration of an example of a solid battery according to the present technology.

Hereinafter, preferred embodiments for implementing the present technology will be described. The embodiments described below are examples of a representative embodiment of the present technology, so that the scope of the present technology is not narrowly interpreted by these embodiments.

1. Outline of Present Technology

First, the outline of the present technology will be described.

In many cases, a solid battery using an oxide as a solid battery material is produced by forming a laminated structure of constituent elements (for example, the solid electrolyte layer, the positive electrode layer, the negative electrode layer, the current collecting layer, and the insulating layer) and integrally sintering the structure. When the laminated body made of different materials is integrally sintered, the laminated layers as the entire battery are adhered by mainly heating and softening an adhesive material made of glass to a glass transition temperature or more. Accordingly, the ratio of the glass component in each of the constituent elements of the battery is important. Further, there is a technique in which the volume ratio among the constituent elements, (particularly the ratio of the active material in each electrode or the like) is examined. In order to realize a high capacity as the battery, it is necessary to make the ratio of the active material in the electrode as large as possible, and the ratio of carbon in the negative electrode may be set to 50 vol % or more or the ratio of the positive electrode active material may be set to 50 vol % or more.

As described above, the ratio of the active material in each electrode layer has been examined. However, in the integrally sintered type battery, the battery made of the constituent elements is sintered all at once. Accordingly, when there is a difference in the ratio of the glass component among the constituent elements, the thermal expansion of each of the constituent elements greatly differs during sintering, and thus cracking, warpage or the like of the battery may occur after sintering.

Under the circumstances, the present inventors have made repetitive studies, and as a result, the present technology has been made. According to the present technology, the difference in the volume ratio of the components of the material having a glass transition point of 500° C. or less among constituent elements of the battery to be integrally sintered is set to a predetermined ratio or less, so that it is possible to reduce the difference in behavior (such as expansion and shrinkage or fluidity of the constituent elements). Thus, it is possible to suppress deformation or breakage of the battery which adversely affects battery characteristics and reliability, such as flaws, cracking, warpage, and internal short-circuit after an integral sintering process.

2. First Embodiment (Example of Solid Battery)

[2-1. Solid Battery]

The solid battery according to the first embodiment of the present technology is a solid battery including: a positive electrode layer; a negative electrode layer; a current collecting layer; a solid electrolyte layer; and an insulating layer, where each of the positive electrode layer, the negative electrode layer, the current collecting layer, the solid electrolyte layer, and the insulating layer contains a material having a glass transition point of 500° C. or less in an amount of 10 vol % to 60 vol %, and among contents of the material having the glass transition point of 500° C. or less in each of the positive electrode layer, the negative electrode layer, the current collecting layer, the solid electrolyte layer, and the insulating layer, a difference between a maximum content and a minimum content is 30 vol % or less.

According to the solid battery of the first embodiment of the present technology, excellent battery characteristics or excellent reliability is realized, and further both of excellent battery characteristics and excellent reliability are realized, thereby achieving a balance between excellent battery characteristics and excellent reliability. Specifically, according to the solid battery of the first embodiment of the present technology, it is possible to suppress deformation or breakage of the battery which adversely affects battery characteristics and reliability (such as flaws, cracking, warpage, and internal short-circuit).

In the solid battery according to the first embodiment of the present technology, the content of the material having a glass transition point of 500° C. or less in each of the positive electrode layer, the negative electrode layer, the current collecting layer, the solid electrolyte layer, and the insulating layer is preferably 10 vol % to 50 vol %.

In the solid battery according to the first embodiment of the present technology, among the contents of the material having a glass transition point of 500° C. or less in each of the positive electrode layer, the negative electrode layer, the current collecting layer, the solid electrolyte layer, and the insulating layer, a difference between the maximum and minimum contents is preferably 20 vol % or less, and more preferably 10 vol % or less.

In the solid battery according to the first embodiment of the present technology, the material having a glass transition point of 500° C. or less contained in at least the positive electrode layer, the negative electrode layer, and the solid electrolyte layer, preferably has an ionic conductivity of $10^{-7}$ S/cm or more. The material has an ionic conductivity of $10^{-7}$ S/cm or more so that the battery can be operated at room temperature. Further, the material having a glass transition point of 500° C. or less contained in at least one of the current collecting layer and the insulating layer, as well as the protective layer and the terminal layer to be described below, may have an ionic conductivity of $10^{-7}$ S/cm or more.

In the solid battery according to the first embodiment of the present technology, for example, a solid electrolyte layer is provided between a positive electrode layer and a negative electrode layer, and a current collecting layer is provided outside the positive electrode layer and the negative electrode layer, and an insulating layer is provided on the outside of each of the two current collecting layers. The insulating layer may further be provided between the solid electrolyte layer and the positive electrode layer and/or between the solid electrolyte layer and the negative electrode layer.

The solid battery according to the first embodiment of the present technology may be a so-called all-solid battery, and may be a secondary battery in which a battery capacity is repeatedly obtained by donation and reception of lithium (Li) as an electrode reactant. Examples of the solid battery according to the first embodiment of the present technology include a lithium ion secondary battery in which a capacity of a negative electrode is obtained by occlusion and release of lithium ions.

In the solid battery according to the first embodiment of the present technology, for example, lithium ions released from the positive electrode layer are taken into the negative electrode layer via the solid electrolyte layer during charging, and lithium ions released from the negative electrode layer are taken into the positive electrode layer via the solid electrolyte layer during discharging.

As described above, the use of lithium as an electrode reactant has been described. However, the solid battery according to the first embodiment of the present technology is not limited to the use of lithium, and for example, other alkali metals such as sodium (Na) or potassium (K), alkaline earth metals such as magnesium (Mg) or calcium (Ca), or other metals such as aluminum (Al) or silver (Ag) may be used for the solid battery according to the first embodiment of the present technology.

[2-2. Material Having Glass Transition Point of 500° C. or Less]

The material having a glass transition point of 500° C. or less is a so-called low melting glass material. The material has a glass transition point of 500° C. or less, and it is preferable that the material have a glass transition point of from 300° C. to 500° C.

Further, the material having a glass transition point of 500° C. or less is preferably a lithium ion-conducting oxide crystallized glass containing Li (lithium), Si (silicon), and B (boron), and also is preferably a lithium ion-conducting oxide crystallized glass containing at least one selected from Li (lithium), Si (silicon), and B (boron).

Further, the material having a glass transition point of 500° C. or less preferably contains an oxide containing lithium (Li), silicon (Si), and boron (B). More specifically, the material having a glass transition point of 500° C. or less contains $Li_2O$, $SiO_2$, and $B_2O_3$. The $Li_2O$ content is preferably 40 mol % to 73 mol % with respect to the total amount of $Li_2O$, $SiO_2$, and $B_2O_3$. The $SiO_2$ content is preferably 8 mol % to 40 mol % with respect to the total amount of $Li_2O$, $SiO_2$, and $B_2O_3$. The $B_2O_3$ content is preferably 10 mol % to 50 mol % with respect to the total amount of $Li_2O$, $SiO_2$, and $B_2O_3$. Further, it is also preferable that the material having a glass transition point of 500° C. or less contains at least one oxide selected from an oxide containing lithium (Li) (e.g., $Li_2O$), an oxide containing silicon (Si) (e.g., $SiO_2$), and an oxide containing boron (B)

(e.g., $B_2O_3$). These contents can be measured using inductively coupled plasma atomic emission spectroscopy (ICP-AES) or the like.

Preferably, oxide glass ($Li_2O:SiO_2:B_2O_3=54:11:35$) or oxide glass ($Bi_2O_3.B_2O_3$) is used as the material having a glass transition point of 500° C. or less.

The material having a glass transition point of 500° C. or less may further contain an additive element, if necessary. Examples of the additive element include one or more selected from the group consisting of Na (sodium), Mg (magnesium), Al (aluminum), P (phosphorus), K (potassium), Ca (calcium), Ti (titanium), V (vanadium), Cr (chromium), Mn (manganese), Fe (iron), Co (cobalt), Ni (nickel), Cu (copper), Zn (zinc), Ga (gallium), Ge (germanium), Se (selenium), Rb (rubidium), S (sulfur), Y (yttrium), Zr (zirconium), Nb (niobium), Mo (molybdenum), Ag (silver), In (indium), Sn (tin), Sb (antimony), Cs (cesium), Ba (Barium), Hf (hafnium), Ta (tantalum), W (tungsten), Pb (lead), Bi (bismuth), Au (gold), La (lanthanum), Nd (neodymium), and Eu (europium).

(Method of Producing Material Having Glass Transition Point of 500° C. or Less)

An example of a method of producing a material having a glass transition point of 500° C. or less will be described below.

First, a plurality of amorphous materials is mixed as raw materials. The amorphous materials to be used include a network-forming oxide, a modifier oxide, and optionally an intermediate oxide. $SiO_2$ and $B_2O_3$ are used as network-forming oxides. $Li_2O$ is used as the modifier oxide. For example, an oxide of at least one or more selected from selected from the group consisting of Na, Mg, Al, P, K, Ca, Ti, V, Cr, Mn, Fe, Co, Ni, Cu, Zn, Ga, Ge, Se, Rb, S, Y, Zr, Nb, Mo, Ag, In, Sn, Sb, Cs, Ba, Hf, Ta, W, Pb, Bi, Au, La, Nd, and Eu is used as the intermediate oxide.

The blending amount of $Li_2O$ with respect to the total amount of $Li_2O$, $SiO_2$, and $B_2O_3$ is preferably 40 mol % or more and 73 mol % or less. The blending amount of $Li_2O$ with respect to the total amount of $Li_2O$, $SiO_2$, and $B_2O_3$ is preferably 8 mol % to 40 mol %. The blending amount of $B_2O_3$ with respect to the total amount of $Li_2O$, $SiO_2$, and $B_2O_3$ is preferably 10 mol % to 50 mol %.

When an intermediate oxide is used as the amorphous material, the blending amount of the intermediate oxide to the total amount of the network-forming oxide, the modifier oxide, and the intermediate oxide is preferably 10 mol % or less.

Generally, the amorphous material is a network-forming oxide (Network former: NWF), a modifier oxide (Network modifier) or an intermediate oxide (Intermediate). The network-forming oxide (Network former: NWF), such as $SiO_2$, $B_2O_3$, $P_2O_5$ or $GeO_2$ can be turned into glass by itself. The modifier oxide (Network modifier) cannot be amorphized by itself, but it can be amorphized within the network structure formed by the above-described network-like oxide, i.e., it can modify the network. It is known that the modifier oxide includes, for example, alkali metals or alkaline earth metals, and has an effect of improving the fluidity by cutting the network structure of the glass. The intermediate oxide (Intermediate) is a raw material having intermediate properties of the network-forming oxide and the modifier oxide, and has an effect of lowering a thermal expansion coefficient, for example, among heat characteristics of the glass.

Finally, the raw material is turned into glass, so that it is possible to produce the material having a glass transition point of 500° C. or less. Examples of the method of turning the raw material into glass include a method of melting a raw material to form a melt and allowing the melt to cool, a method of pressing the melt with a metal plate or the like, a method of casting into mercury, a strip furnace method, a splat quenching method, a roll method (single or twin), or any other method, such as a mechanical milling method, a sol-gel method, a vapor deposition method, a sputtering method, a laser ablation method, a pulse laser deposition (PLD) method, and a plasma method.

The glass transition point of the material having a glass transition point of 500° C. or less can be measured by a known method, and it can be measured, for example, by thermogravimetry (TG) measurement.

[2-3. Solid Electrolyte Layer]

The solid battery according to the first embodiment of the present technology includes a solid electrolyte layer.

As described above, the solid electrolyte layer includes the material having a glass transition point of 500° C. or less. The solid electrolyte layer may further contain a solid electrolyte, and further it may contain a binding agent to be described later, if necessary.

Examples of the solid electrolyte include one or two or more of crystalline solid electrolytes. The type of the crystalline solid electrolyte is not particularly limited as long as it is a crystalline solid electrolyte capable of conducting lithium ions, and is, for example, an inorganic material or a polymer material. The inorganic material is a sulfide such as $Li_2S$—$P_2S_5$, $Li_2S$—$SiS_2$—$Li_3PO_4$, $Li_7P_3S_{11}$, $Li_{3.25}Ge_{0.25}P_{0.75}S$ or $Li_{10}GeP_2S_{12}$, or an oxide such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$ or $La_{2/3-x}Li_{3x}TiO_3$. The polymer material is, for example, polyethylene oxide (PEO).

[2-4. Positive Electrode Layer]

The solid battery according to the first embodiment of the present technology contains a positive electrode layer.

As described above, the positive electrode layer contains the material having a glass transition point of 500° C. or less. The positive electrode layer may contain one or two or more of positive electrode active materials, and may further contain an additive (such as a binding agent or a conductive agent) and the solid electrolyte, if necessary.

The positive electrode active material includes a positive electrode material capable of occluding and releasing lithium ions as an electrode reactant. From the viewpoint of obtaining a high energy density, the positive electrode material is preferably a lithium-containing compound or the like, but is not limited thereto. The lithium-containing compound is, for example, a composite oxide containing lithium and a transition metal element as constituent elements (lithium transition metal composite oxide) or a phosphate compound containing lithium and a transition metal element as constituent elements (lithium transition metal phosphate compound). In particular, the transition metal element is preferably any one of, or two or more of cobalt (Co), nickel (Ni), manganese (Mn), and iron (Fe). This is because a higher voltage is achieved.

The chemical formula of the lithium transition metal composite oxide is represented by, for example, $Li_xM1O_2$ or $Li_yM2O_4$, and the chemical formula of the lithium transition metal phosphate compound is represented by, for example, $Li_zM3PO_4$. However, M1 to M3 are one or two or more transition metal elements, and the values of x to z are arbitrary.

The lithium transition metal composite oxide is, for example, $LiCoO_2$, $LiNiO_2$, $LiVO_2$, $LiCrO_2$ or $LiMn_2O_4$. The lithium transition metal phosphate compound is, for example, $LiFePO_4$ or $LiCoPO_4$.

Besides, the positive electrode active material may be, for example, an oxide, a disulfide, a chalcogenide or a conductive polymer. The oxide is, for example, a titanium oxide, a vanadium oxide or a manganese dioxide. The disulfide is, for example, a titanium disulfide or a molybdenum sulfide. The chalcogenide is, for example, a niobium selenide. The conductive polymer is, for example, sulfur, polyaniline or polythiophene.

The positive electrode active material may contain a powder of positive electrode active material particles. The surface of the positive electrode active material particles may be coated with a coating agent. Here, the coating is not limited to such that the surface of the positive electrode active material particles is entirely coated, but may be such that the surface of the positive electrode active material particles is partially coated. The coating agent is, for example, at least one of a solid electrolyte and a conductive agent. The surface of the positive electrode active material particles is coated with the coating agent, so that the interface resistance between the positive electrode active material and the solid electrolyte can be reduced. Further, the coating agent can also suppress the collapse of the structure of the positive electrode active material, which can widen the sweep potential range to increase the amount of lithium available for the reaction and can also improve the cycle characteristics.

The binding agent is, for example, any one of, or two or more of synthetic rubbers and polymer materials. The synthetic rubber is, for example, styrene-butadiene rubber, fluorine rubber or ethylene propylene diene. The polymer material is, for example, polyvinylidene fluoride or polyimide. The binding agent is used to bind particles of the positive electrode active material. When the positive electrode is sufficiently bonded by a material (glass material) having a glass transition point of 500° C. or less, the positive electrode does not necessarily contain the binding agent.

The conductive agent includes, for example, one of, or two or more of a carbon material, a metal, a metal oxide, and a conductive polymer. The carbon material is, for example, graphite, carbon black, acetylene black, ketjen black or a carbon fiber. The metal oxide is, for example, $SnO_2$. Note that the conductive agent is not limited to the above examples, and may be a material having conductivity.

[2-5. Negative Electrode Layer]

The solid battery according to the first embodiment of the present technology includes a negative electrode layer.

As described above, the negative electrode layer contains the material having a glass transition point of 500° C. or less. The negative electrode layer may contain one or two or more of negative electrode active materials, and may further contain an additive (such as a binding agent or a conductive agent) and the solid electrolyte, if necessary.

The negative electrode active material includes a negative electrode material capable of occluding and releasing lithium ions as an electrode reactant. From the viewpoint of obtaining a high energy density, the negative electrode material is preferably a carbon material or a metallic material, but is not limited thereto.

The carbon material is, for example, graphitizable carbon, non-graphitizable carbon, graphite, mesocarbon microbeads (MCMB) or highly oriented pyrolytic graphite (HOPG).

The metallic material is, for example, a material containing, as a constituent element, a metal element or a metalloid element capable of forming an alloy with lithium. More specifically, the metallic material is, for example, any one of, or two or more of a simple substance, an alloy, or a compound of silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), and platinum (Pt). In this regard, the simple substance is not limited to a substance with a purity of 100%, and may contain a small amount of impurities. The metallic material is, for example, Si, Sn, $SiB_4$, $TiSi_2$, SiC, $Si_3N_4$, $SiO_v(0<v\leq2)$, LiSiO, $SnO_w$ $(0<w\leq2)$, $SnSiO_3$, LiSnO or $Mg_2Sn$.

Besides the above, the metallic material may also be a lithium-containing compound or lithium metal (a simple substance of lithium). The lithium-containing compound is a composite oxide containing lithium and a transition metal element as constituent elements (lithium transition metal composite oxide), such as $Li_4Ti_5O_{12}$.

The negative electrode active material contains a powder of negative electrode active material particles. The surface of the negative electrode active material particles may be coated with a coating agent. Here, the coating is not limited to such that the surface of the negative electrode active material particles is entirely coated, but may be such that the surface of the negative electrode active material particles is partially coated. The coating agent is, for example, at least one of a solid electrolyte and a conductive agent. The surface of the negative electrode active material particles is coated with the coating agent, so that the interface resistance between the negative electrode active material and the solid electrolyte can be reduced. Further, the coating agent can also suppress the collapse of the structure of the negative electrode active material, which can widen the sweep potential range to increase the amount of lithium available for the reaction and can also improve the cycle characteristics.

The binding agent and the conductive agent are as described above.

[2-6. Current Collecting Layer]

The solid battery according to the first embodiment of the present technology includes a current collecting layer.

As described above, the current collecting layer contains the material having a glass transition point of 500° C. or less. The current collecting layer may contain a material having high electrical conductivity, in addition to the material having a glass transition point of 500° C. or less. Examples of the material contained in the current collecting layer for the positive electrode include common carbon-based materials (such as carbon, graphite, and carbon nanotubes), metals (such as Cu, Mg, Ti, Fe, Co, Ni, Zn, Al, Ge, In, Au, Pt, Ag, and Pd), and an alloy containing any of these metals. As the material contained in the current collecting layer for the negative electrode, the same material as the current collecting layer for the positive electrode can be used.

The material constituting the current collecting layer for the positive electrode may be the same as or different from the material constituting the positive electrode layer. Further, the material constituting the current collecting layer for the negative electrode may be the same as or different from the material constituting the negative electrode layer.

Further, the current collecting layer for the positive electrode and the current collecting layer for the negative electrode may contain the positive electrode active material and the negative electrode active material, respectively. For example, a conductive carbon material (graphite), i.e., the negative electrode active material, may be contained in the current collecting layer for the negative electrode. The content ratio of the conductive carbon material is not particularly limited as long as the function of the current collecting layer is achieved, and the volume ratio of the positive electrode current collector/the positive electrode active material or the volume ratio of the negative electrode current collector/the negative electrode active material is in a range of 90/10 to 70/30. The current collecting layer for the positive electrode and the current collecting layer for the negative electrode include the positive electrode active material and the negative electrode active material, respectively, so that the adhesion between the current collecting layer for the positive electrode and the positive electrode active material layer and the adhesion between the current collecting layer for the negative electrode and the negative electrode active material layer are improved. Thus, this is preferable.

The current collecting layer may further contain an additive such as a binding agent, if necessary.

[2-7. Insulating Layer]

The solid battery according to the first embodiment of the present technology includes an insulating layer.

As described above, the insulating layer contains the material having a glass transition point of 500° C. or less. The insulating layer may contain an inorganic insulating material and/or an organic insulating material, in addition to the material having a glass transition point of 500° C. or less. Examples of the inorganic insulating material include aluminum oxide ($Al_2O_3$), silicon oxide ($SiO_2$), magnesium oxide (MgO), titanium oxide ($TiO_2$), and zirconium oxide ($ZrO_2$), and examples of the organic insulating material include polyvinylidene fluoride and a copolymer of vinylidene fluoride and hexafluoropropylene.

The insulating layer may further contain an additive such as a binding agent, if necessary.

[2-8. Protective Layer]

The solid battery according to the first embodiment of the present technology may further include a protective layer. The protective layer may be disposed as the outermost layer of the solid battery of the first embodiment of the present technology.

The protective layer contains the material having a glass transition point of 500° C. or less. For example, the content of the material having a glass transition point of 500° C. or less in the protective layer may be higher or lower than the content of the material having a glass transition point of 500° C. or less in each of the positive electrode layer, the negative electrode layer, the current collecting layer, and the insulating layer.

The protective layer is provided for protecting the solid battery electrically, physically, and chemically, and thus the reliability of the solid battery can be improved. In addition to the material having a glass transition point of 500° C. or less, the protective layer may contain a material which has excellent insulating property, excellent durability, and excellent moisture resistance and is environmentally safe. Examples of the material include thermosetting resins and photocurable resins.

The protective layer may further contain an additive such as a binding agent, if necessary.

[2-9. Terminal Layer]

The solid battery according to the first embodiment of the present technology may further include a terminal layer. The solid battery may be disposed at an electrode extraction portion of the positive electrode layer and/or the negative electrode layer.

The terminal layer contains the material having a glass transition point of 500° C. or less. For example, the content of the material having a glass transition point of 500° C. or less in the terminal layer may be higher or lower than, for example, the content of the material having a glass transition point of 500° C. or less in each of the positive electrode layer, the negative electrode layer, the current collecting layer, and the insulating layer.

In addition to the material having a glass transition point of 500° C. or less, the terminal layer may contain a material having high electrical conductivity, such as silver, gold, platinum, aluminum, copper, tin, or nickel.

The terminal layer may further contain an additive such as a binding agent, if necessary.

[2-10. Method of Producing Solid Battery]

The method of producing the solid battery according to the first embodiment of the present technology will be described. This production method includes the steps of: forming a positive electrode layer, a negative electrode layer, a solid electrolyte layer, a current collecting layer, and an insulating layer, as well as a protective layer and a terminal layer, if necessary, by a coating method; and laminating these layers and subjecting them to a heat treatment. All of the positive electrode layer, the negative electrode layer, the solid electrolyte layer, the current collecting layer, the insulating layer, the protective layer, and the terminal layer may be green sheets, or at least one of the positive electrode layer, the negative electrode layer, the solid electrolyte layer, the current collecting layer, the insulating layer, the protective layer, and the terminal layer may be a green sheet. When at least one of the positive electrode layer, the negative electrode layer, the solid electrolyte layer, the current collecting layer, the insulating layer, the protective layer, and the terminal layer is a green sheet, a layer other than the green sheet (for example, a slurry) may be formed on at least one green sheet by, for example, a screen printing method.

Further, the solid battery of the first embodiment according to the present technology may be produced by a method other than the coating method. As the method other than the coating method, for example, a method of pressure-molding a powder of an electrode mixture containing an active material and the material having a glass transition point of 500° C. or less with a press machine or the like may be used. The shape of the molded body formed by pressure-molding is not particularly limited, and it may be, for example, a pellet shape (coin shape).

3. Second Embodiment (Modified Example of Solid Battery)

[3-1. Solid Battery]

A solid battery according to a second embodiment of the present technology is a solid battery including: a positive electrode layer; a negative electrode layer; a current collecting layer; a solid electrolyte layer; and an insulating layer, where the solid electrolyte layer is made of a material having a glass transition point of 500° C. or less, each of the positive electrode layer, the negative electrode layer, the current collecting layer, and the insulating layer contains a material having a glass transition point of 500° C. or less in an amount of 10 vol % to 60 vol %, and among the contents of the material having a glass transition point of 500° C. or less in each of the positive electrode layer, the negative electrode layer, the current collecting layer, and the insulating layer, a difference between a maximum content and a minimum content is 30 vol % or less.

According to the solid battery of the second embodiment of the present technology, an effect of excellent battery characteristics or excellent reliability is exerted, and further both of the effect of excellent battery characteristics and the effect of excellent reliability are exerted, thereby achieving a balance between the effect of excellent battery characteristics and the effect of excellent reliability. Specifically, according to the solid battery of the second embodiment of the present technology, it is possible to suppress deformation or breakage of the battery which adversely affects battery characteristics and reliability (such as flaws, cracking, warpage, and internal short-circuit).

In the solid battery according to the second embodiment of the present technology, the solid electrolyte layer is made of the material having a glass transition point of 500° C. or less. That is, the solid electrolyte layer is made of 100 vol % of the material having a glass transition point of 500° C. or less.

In the solid battery according to the second embodiment of the present technology, the content of the material having a glass transition point of 500° C. or less in each of the positive electrode layer, the negative electrode layer, the current collecting layer, and the insulating layer is preferably 10 vol % to 50 vol %.

In the solid battery according to the second embodiment of the present technology, among the contents of the material having a glass transition point of 500° C. or less in each of the positive electrode layer, the negative electrode layer, the current collecting layer, and the insulating layer, a difference between a maximum content and a minimum content is preferably 20 vol % or less, and more preferably 10 vol % or less.

In the solid battery according to the second embodiment of the present technology, the material having a glass transition point of 500° C. or less contained in at least the positive electrode layer and the negative electrode layer and the material having a glass transition point of 500° C. or less constituting the solid electrolyte layer preferably have an ionic conductivity of $10^{-7}$ S/cm or more. The material has an ionic conductivity of $10^{-7}$ S/cm or more, so that the battery can be operated at room temperature. Further, the material having a glass transition point of 500° C. or less contained in at least one of the current collecting layer and the insulating layer, as well as the protective layer and the terminal layer to be described below, may have an ionic conductivity of $10^{-7}$ S/cm or more.

The solid battery according to the second embodiment of the present technology may further include a protective layer, and the protective layer contains the material having a glass transition point of 500° C. or less. The content of the material having a glass transition point of 500° C. or less in the protective layer may be higher or lower than the content of the material having a glass transition point of 500° C. or less in each of the positive electrode layer, the negative electrode layer, the current collecting layer, and the insulating layer.

The solid battery according to the second embodiment of the present technology may further include a terminal layer, and the terminal layer contains the material having a glass transition point of 500° C. or less. The content of the material having a glass transition point of 500° C. or less in the terminal layer may be higher or lower than the content of the material having a glass transition point of 500° C. or less in each of the positive electrode layer, the negative electrode layer, the current collecting layer, and the insulating layer.

The description of the solid battery according to the second embodiment of the present technology is the same as the description of the solid battery according to the first embodiment of the present technology except for the above description, and thus the detailed explanation thereof is omitted herein.

4. Application of Solid Battery

The application of the solid battery will be described in detail below.

<4-1. Outline of Application of Solid Battery>

The application of the solid battery is not particularly limited, as long as the solid battery is applied to machines, devices, instruments, apparatuses, systems, and the like (assembly of multiple devices or the like) that can use the solid battery as a driving power supply, a power storage source for reserve of power, or the like. The solid battery used as a power supply may be a main power supply (a power supply to be used preferentially) or an auxiliary power supply (a power supply which is used in place of the main power supply or by being switched from the main power supply). When the solid battery is used as an auxiliary power supply, the type of the main power supply is not limited to the solid battery.

Here are applications of the solid battery, for example: electronic devices (including portable electronic devices) such as notebook personal computers, tablet computers, mobile phones (such as smart phones), personal digital assistants (PDA), imagers (such as digital still cameras or digital video cameras), audio devices (such as portable audio players), game devices, cordless phone handsets, e-books, electronic dictionaries, radios, headphones, navigation systems, memory cards, pacemakers, hearing aids, lighting devices, toys, medical devices, and robots; portable life instruments such as electric shavers; storage devices such as backup power supplies and memory cards; power tools such as electric drills and electric saws; battery packs used for notebook personal computers or the like as a detachable power supply; medical electronic devices such as pacemakers and hearing aids; vehicles used as electric cars (including hybrid cars); and power storage systems such as a domestic battery system that stores electric power in preparation for emergency or the like. Of course, the application of the solid battery may be any other application than the foregoing.

Above all, it is effective to apply the solid battery to a battery pack, a vehicle, a power storage system, a power tool, and an electronic device. This is because, since excellent battery characteristics are required, the use of the solid battery according to the present technology can improve the performance effectively. The battery pack is a power supply that uses a solid battery, and is a so-called assembled battery or the like. The vehicle is a vehicle that operates (travels) with the solid battery as a driving power supply, and may be a car (a hybrid car or the like) provided with a driving source other than the solid battery as described above. The power storage system is, for example, a power storage system for a house, and is a system that uses a solid battery as a power storage source. For example, for a power storage system, electric power is stored in the solid battery which serves as a power storage source, thus making it possible to use a power consumption device such as a home electric appliance through the use of electric power. The power tool is a tool which makes a movable part (such as a drill) movable with the solid battery as a driving power supply. The electronic device is a device that performs various functions with the solid battery as a driving power supply (power supply source).

In this regard, some application examples of the solid battery will be specifically described. It is to be noted that the configuration of each application example described below is just considered by way of example, and the configuration can be thus changed appropriately.

<4-2. Third Embodiment (Battery Pack)>

A battery pack according to a third embodiment of the present technology includes the solid battery according to the first or second embodiment of the present technology, a control unit that controls the usage state of the solid battery, and a switch unit that switches the usage state of the solid battery in response to an instruction from the control unit. The battery pack according to the third embodiment of the present technology includes the solid battery according to the first or second embodiment of the present technology having excellent battery characteristics and excellent reliability, which leads to improved performance and reliability of the battery pack.

Hereinafter, the battery pack according to the third embodiment of the present technology will be described with reference to the drawings.

Figure 2:
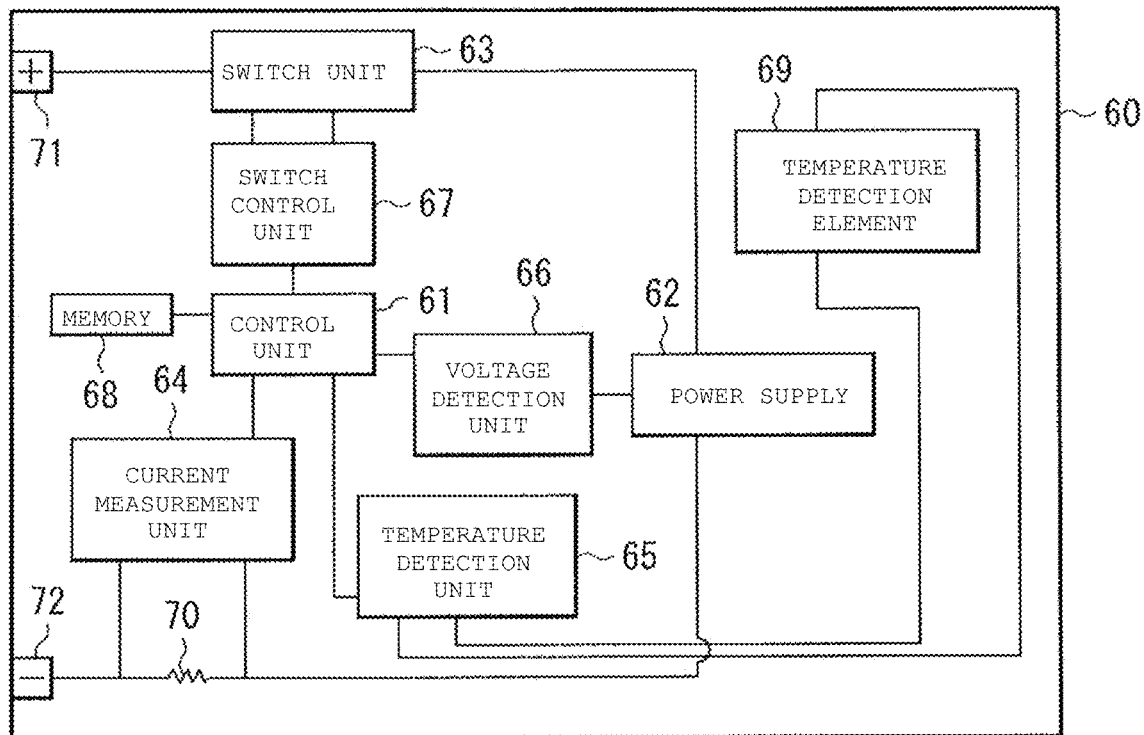
FIG. 2 is a block diagram illustrating a configuration of an application example (battery pack) of the solid battery according to the present technology.

FIG. 2 illustrates a block configuration of the battery pack. This battery pack includes, for example, inside a housing 60 formed of a plastic material, a control unit 61, a power supply 62, a switch unit 63, a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72.

The control unit 61 controls the operation of the entire battery pack (including the usage state of the power supply 62), and includes, for example, a central processing unit (CPU) and the like. The power supply 62 includes one or two or more solid batteries (not illustrated). The power supply 62 is, for example, an assembled battery including two or more solid batteries, and the connection form of the solid batteries may be a connection in series, a connection in parallel, or a mixed type of both the connections. To give an example, the power supply 62 includes six solid batteries connected in the form of two in parallel and three in series.

In response to an instruction from the control unit 61, the switch unit 63 switches the usage state of the power supply 62 (whether there is a connection between the power supply 62 and an external device). This switch unit 63 includes, for example, a charge control switch, a discharge control switch, a charging diode, a discharging diode (all of them are not illustrated). The charge control switch and the discharge control switch serve as, for example, semiconductor switches such as a field effect transistor (MOSFET) using a metal oxide semiconductor.

The current measurement unit 64 measures current through the use of the current detection resistor 70, and outputs the measurement result to the control unit 61. It is configured that the temperature detection unit 65 measures a temperature through the use of the temperature detection element 69, and outputs the measurement result to the control unit 61. The temperature measurement result is used, for example, when the control unit 61 controls charge/discharge in the case of abnormal heat generation, when the control unit 61 executes correction processing in the case of remaining capacity calculation, and the like. The voltage detection unit 66 measures the voltage of the solid battery in the power supply 62, analog-digital converts the measured voltage, and supplies the voltage to the control unit 61.

The switch control unit 67 controls the operation of the switch unit 63 in response to the signals input from the current measurement unit 64 and the voltage detection unit 66.

For example, when the battery voltage reaches the overcharge detection voltage, the switch control unit 67 disconnects the switch unit 63 (charge control switch), thereby preventing any charging current from flowing through the current path of the power supply 62. Thus, only discharge is allowed via the discharging diode in the power supply 62. For example, when a large current flows during charging, the switch control unit 67 is configured to shut off the charging current.

In addition, for example, when the battery voltage reaches the overdischarge detection voltage, the switch control unit 67 disconnects the switch unit 63 (discharge control switch), thereby preventing any discharging current from flowing through the current path of the power supply 62. Thus, only charge is allowed via the charging diode in the power supply 62. For example, when a large current flows during discharging, the switch control unit 67 is configured to shut off the discharging current.

In the solid battery, for example, the overcharge detection voltage is 4.2 V±0.05 V and the overdischarge detection voltage is 2.4 V±0.1 V.

The memory 68 is, for example, an EEPROM that is a non-volatile memory. This memory 68 stores, for example, numerical values calculated by the control unit 61, information on the solid battery, measured at the stage of manufacturing process (for example, internal resistance in the initial state), and the like. Further, storing the full charge capacity of the solid battery in the memory 68 makes it possible for the control unit 61 to grasp information such as the remaining capacity.

The temperature detection element 69 measures the temperature of the power supply 62 and outputs the measurement result to the control unit 61, and is, for example, a thermistor.

The positive electrode terminal 71 and the negative electrode terminal 72 are terminals connected to an external device (for example, a notebook personal computer) operated through the use of the battery pack, an external device (for example, a charger) used for charging the battery pack, or the like. The power supply 62 is charged and discharged via the positive electrode terminal 71 and the negative electrode terminal 72.

<4-3. Fourth Embodiment (Vehicle)>

A vehicle according to a fourth embodiment of the present technology includes the solid battery according to the first or second embodiment, a driving force converting device that converts electric power supplied from the solid battery into a driving force, a driving unit that drives in response to the driving force, and a vehicle control device. The vehicle according to the fourth embodiment of the present technology includes the solid battery according to the first or second embodiment of the present technology having excellent battery characteristics and excellent reliability, which leads to improved performance and reliability of the vehicle.

Hereinafter, the vehicle according to the fourth embodiment of the present technology will be described with reference to FIG. 3.

Figure 3:
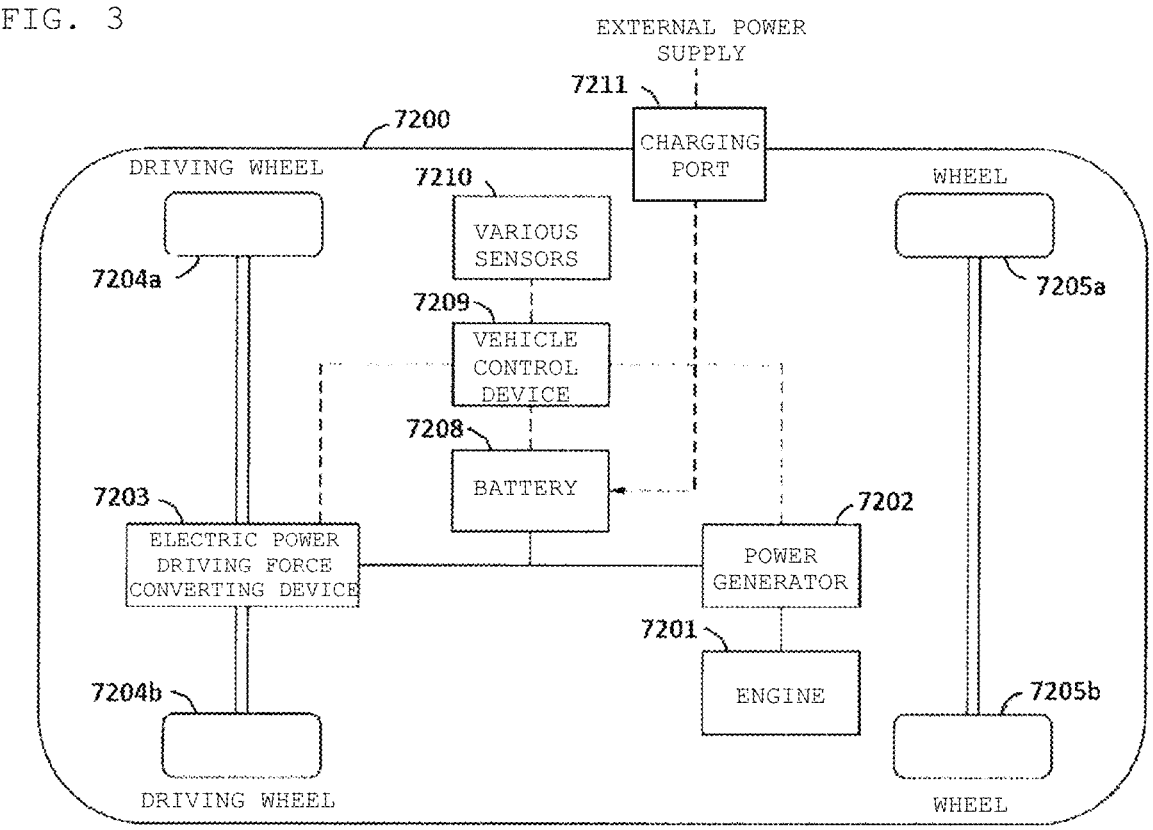
FIG. 3 is a block diagram illustrating a configuration of an application example (vehicle) of the solid battery according to the present technology.

FIG. 3 schematically illustrates an example of a configuration of a hybrid vehicle employing a series hybrid system to which the present technology is applied. The series hybrid system is a car that runs with an electric power driving force converting device by using electric power generated by a power generator driven by an engine or electric power once stored in a battery.

In a hybrid vehicle 7200, an engine 7201, a power generator 7202, an electric power driving force converting device 7203, a driving wheel 7204a, a driving wheel 7204b, a wheel 7205a, a wheel 7205b, a battery 7208, a vehicle control device 7209, various sensors 7210, and a charging port 7211 are mounted. A power storage device (not illustrated) is applied to the battery 7208.

The hybrid vehicle 7200 runs by using the electric power driving force converting device 7203 as a power source. An example of the electric power driving force converting device 7203 is a motor. The electric power driving force converting device 7203 is operated by the electric power of the battery 7208 and a rotational force of the electric power driving force converting device 7203 is transmitted to the driving wheels 7204$a$ and 7204$b$. It is to be noted that direct current-alternating current (DC-AC) conversion or reverse conversion (AC-DC conversion) is used for the necessary portion, whereby the electric power driving force converting device 7203 can be applied to either an AC motor or a DC motor. The various sensors 7210 control the rotation speed of the engine via the vehicle control device 7209 and control the opening (throttle opening) of a throttle valve (not shown). The various sensors 7210 include a speed sensor, an acceleration sensor, an engine speed sensor, and the like.

The rotational force of the engine 7201 is transmitted to the power generator 7202, and the electric power generated by the power generator 7202 through the rotational force can be accumulated in the battery 7208.

When the hybrid vehicle decelerates by a braking mechanism (not illustrated), the resistance force at the time of deceleration is applied to the electric power driving force converting device 7203 as a rotational force, and the regenerative electric power generated by the electric power driving force converting device 7203 through the rotational force is accumulated in the battery 7208.

The battery 7208 is connected to a power supply outside the hybrid vehicle so that it is possible to receive supply of electric power from the external power supply by using the charging port 211 as an input port and to thereby accumulate the received electric power.

Although not illustrated, the hybrid vehicle may include an information processing device that performs information processing relating to vehicle control based on information on the secondary battery. As such an information processing device, for example, there is an information processing device for displaying the remaining battery capacity based on information on the remaining capacity of the battery.

The above is an example of the series hybrid car that runs with a motor by using the electric power generated by a power generator driven by an engine or the electric power once stored in the battery. However, the present technology can be effectively applied to a parallel hybrid car which employs both outputs of engine and motor as the driving source, and uses, with appropriate switching, three systems, running by only the engine, running by only the motor, and running by the engine and the motor. Furthermore, the present technology can be effectively applied to a so-called electric vehicle which does not use an engine and runs by driving by only a driving motor.

<4-4. Fifth Embodiment (Power Storage System)>

A power storage system according to a fifth embodiment of the present technology includes: a power storage device including the solid battery according to the first or second embodiment of the present technology; a power consumption device to which electric power is supplied from the solid battery; a control device which controls electric power supply from the solid battery to the power consumption device; and a power generation device which charges the solid battery. The power storage system according to the fifth embodiment of the present technology includes the solid battery according to the first or second embodiment of the present technology having excellent battery characteristics and excellent reliability, which leads to improved performance and reliability of the power storage system.

Figure 4:
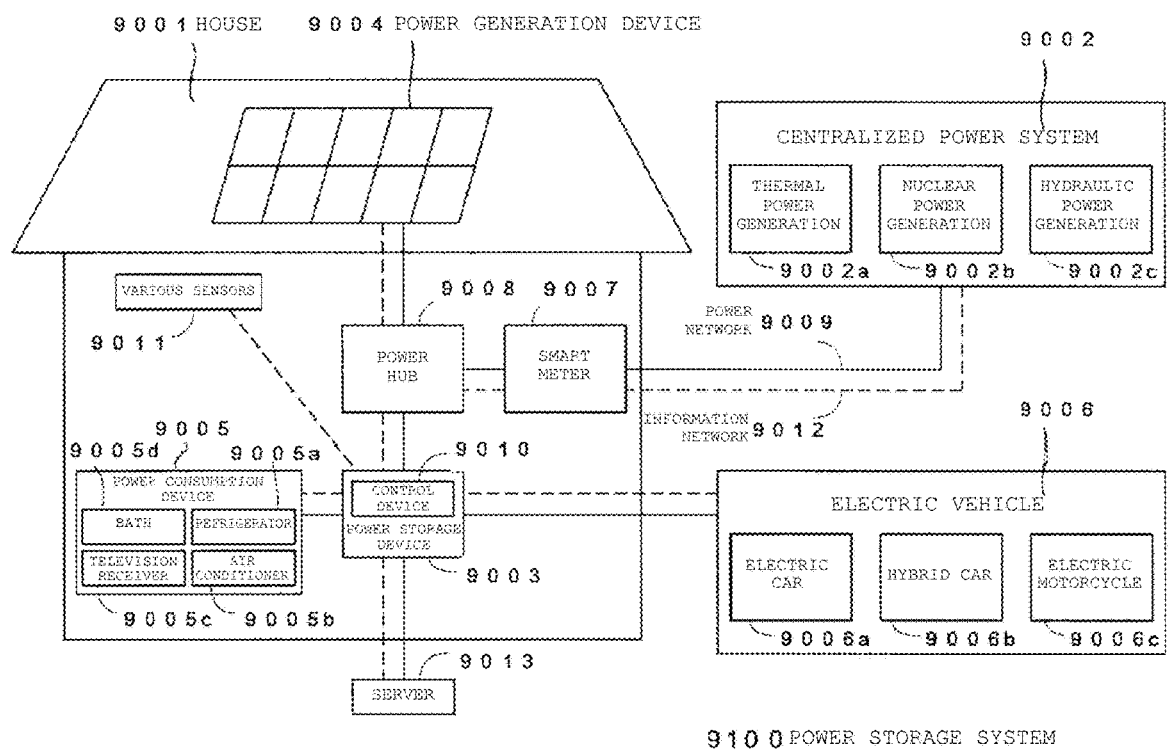
FIG. 4 is a block diagram illustrating a configuration of an application example (power storage system) of the solid battery according to the present technology.

Hereinafter, the power storage system for a house, which is an example of the power storage system according to the fifth embodiment of the present technology, will be described with reference to FIG. 4.

For example, in a power storage system 9100 for a house 9001, electric power is supplied from a centralized power system 9002 such as a thermal power generation 9002$a$, a nuclear power generation 9002$b$ or a hydraulic power generation 9002$c$ to a power storage device 9003 via a power network 9009, an information network 9012, a smart meter 9007, a power hub 9008, and the like. With this, electric power is supplied from an independent power supply such as a domestic power generation device 9004 to the power storage device 9003. The electric power supplied to the power storage device 9003 is stored. Electric power to be used in the house 9001 is supplied using the power storage device 9003. A similar power storage system can be used not only for the house 9001 but also for a building.

The house 9001 is provided with the power generation device 9004, a power consumption device 9005, the power storage device 9003, a control device 9010 for controlling the devices, the smart meter 9007, and a sensor 9011 for acquiring various kinds of information. Each of the devices is connected by the power network 9009 and the information network 9012. A solar cell, a fuel cell, or the like is used as the power generation device 9004, and the generated electric power is supplied to the power consumption device 9005 and/or the power storage device 9003. The power consumption device 9005 is a refrigerator 9005$a$, an air conditioner 9005$b$, a television receiver 9005$c$, a bath 9005$d$, or the like. Furthermore, the power consumption device 9005 includes an electric vehicle 9006. The electric vehicle 9006 is an electric car 9006$a$, a hybrid car 9006$b$, an electric motorcycle 9006$c$, or the like.

The battery unit of the present disclosure is applied to the power storage device 9003. The power storage device 9003 is configured by a secondary battery or a capacitor. The power storage device is configured by, for example, a lithium-ion battery. The lithium-ion battery may be stationary or may be used in the electric vehicle 9006. The smart meter 9007 includes a function of measuring the use amount of commercial electric power and sending the use amount measured to an electric power company. The power network 9009 may be any one or combination of DC power feed, AC power feed, and non-contact power feed.

The various sensors 9011 include, for example, a human sensor, an illuminance sensor, an object detection sensor, a power consumption sensor, a vibration sensor, a contact sensor, a temperature sensor, and an infrared sensor. Information acquired by the various sensors 9011 is transmitted to the control device 9010. Based on the information from the sensors 9011, the state of weather, the state of person, and the like are grasped and the power consumption device 9005 can be automatically controlled to minimize energy consumption. Further, the control device 9010 can transmit information on the house 9001 to an external electric power company or the like via the Internet.

The power hub 9008 performs processes such as branching of power lines and DC/AC conversion. As a communication method of the information network 9012 connected to the control device 9010, a method of using a communication interface such as a Universal Asynchronous Receiver-Transmitter: transmission/reception circuit for asynchronous serial communication (UART) and a method of using a sensor network in accordance with a wireless communication standard, such as Bluetooth (registered trademark), ZigBee or Wi-Fi, can be utilized. The Bluetooth (registered trademark) system is applied to multimedia communication and can perform one-to-many connection communication. ZigBee uses the physical layer of IEEE (Institute of Electrical and Electronics Engineers) 802.15.4. IEEE 802.15.4 is a name of a short range wireless network standard called PAN (Personal Area Network) or W (Wireless) PAN.

The control device 9010 is connected to an external server 9013. The server 9013 may be managed by any of the house 9001, the electric power company, and a service provider. The information transmitted and received by the server 9013 is, for example, power consumption information, life pattern information, a power fee, weather information, natural disaster information, and power transaction information. This information may be transmitted and received from a power consumption device (e.g., a television receiver) in the home, but it may be transmitted and received from a device outside the home (e.g., a mobile phone). This information may be displayed on a device having a display function such as a television receiver, a mobile phone or a personal digital assistant (PDA).

The control device 9010 that controls each unit includes a CPU, a Random Access Memory (RAM), and a Read Only Memory (ROM), and is housed in the power storage device 9003 in this example. The control device 9010 is connected to the power storage device 9003, the domestic power generation device 9004, the power consumption device 9005, the various sensors 9011, the server 9013, and the information network 9012. The control device 9010 has, for example, a function of adjusting the use amount of commercial electric power and the amount of power generation. The control device 9010 may include a function of performing electric power transaction in an electric power market.

As described above, not only electric power generated by the centralized power system 9002 (such as the thermal power generation 9002*a*, the nuclear power generation 9002*b* or the hydraulic power generation 9002*c*), but also electric power generated by the domestic power generation device 9004 (solar power generation, wind power generation) can be stored in the power storage device 9003. Therefore, even if the electric power generated by the domestic power generation device 9004 varies, it is possible to perform control such that the amount of electric power sent to the outside is made constant or is discharged as necessary. For example, electric power obtained by solar power generation is stored in the power storage device 9003, low-cost midnight electric power is stored in the power storage device 9003 in the night, and the electric power stored by the power storage device 9003 is discharged and utilized in a high-cost time zone in the daytime.

Although the example in which the control device 9010 is stored in the power storage device 9003 has been described, the control device 9010 may be stored in the smart meter 9007 or may be configured singly. Further, the power storage system 9100 may be used for a plurality of homes in collective housing, or may be used for a plurality of detached houses.

<4-5. Sixth Embodiment (Power Tool)>

A power tool according to a sixth embodiment of the present technology is a power tool including the solid battery according to the first or second embodiment of the present technology and a movable part to which electric power is supplied from the solid battery. The power tool according to the sixth embodiment of the present technology includes the solid battery according to the first or second embodiment of the present technology having excellent battery characteristics and excellent reliability, which leads to improved performance and reliability of the power tool.

Hereinafter, the power tool according to the sixth embodiment of the present technology will be described with reference to FIG. 5.

Figure 5:
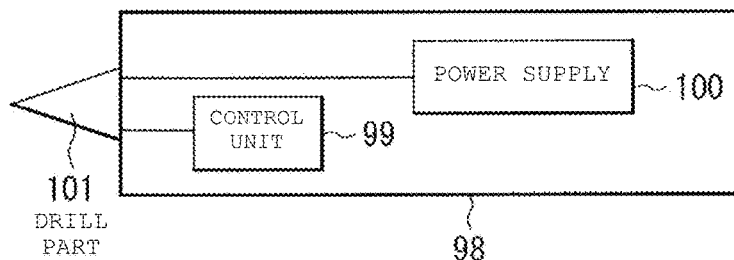
FIG. 5 is a block diagram illustrating a configuration of an application example (power tool) of the solid battery of the present technology.

FIG. 5 illustrates a block configuration of a power tool. The power tool is, for example, an electric drill, and includes a control unit 99 and a power supply 100 inside a tool body 98 formed of a plastic material or the like. For example, a drill part 101 as a movable part is operatably (rotatably) attached to the tool body 98.

The control unit 99 controls the operation of the entire power tool (including the usage state of the power supply 100), and includes, for example, a CPU and the like. The power supply 100 includes one or more solid batteries (not illustrated). The control unit 99 is configured to supply electric power from the power supply 100 to the drill part 101 in response to an operation of an operation switch (not illustrated).

<4-6. Seventh Embodiment (Electronic Device)>

An electronic device according to a seventh embodiment of the present technology includes the solid battery according to the first embodiment of the present technology or the solid battery according to the second embodiment of the present technology, and receives electric power from the solid battery. As described above, the electronic device according to the seventh embodiment of the present technology is a device that performs various functions with the solid battery as a driving power supply (power supply source). The electronic device according to the seventh embodiment of the present technology includes the solid battery according to the first or second embodiment of the present technology having excellent battery characteristics and excellent reliability, which leads to improved performance and reliability of the electronic device.

Figure 6:
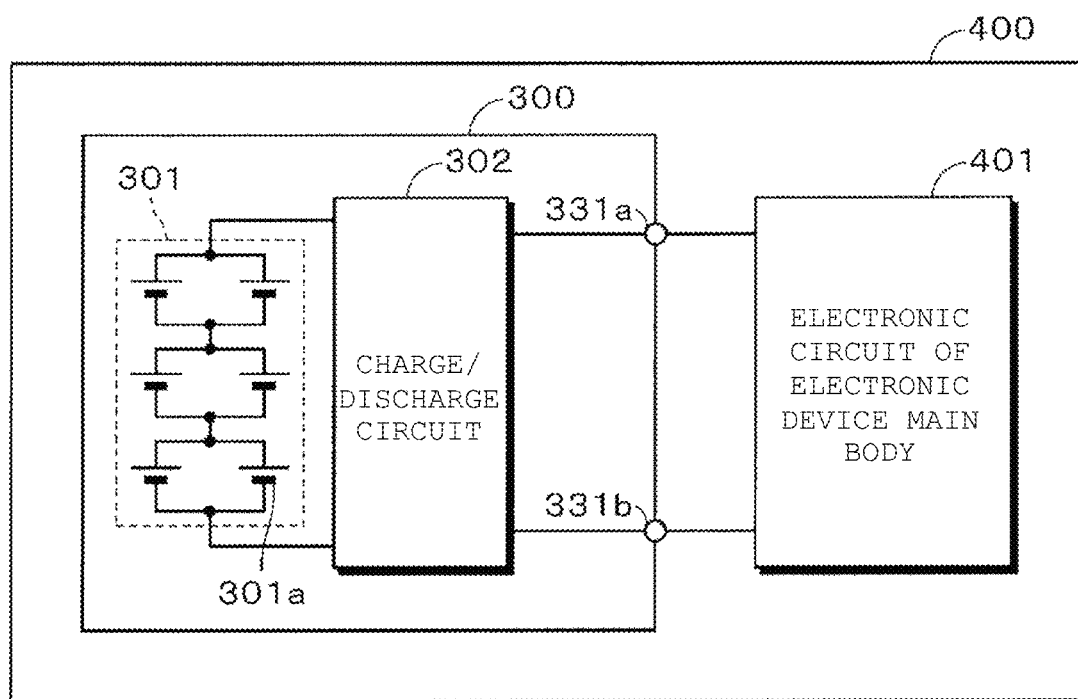
FIG. 6 is a block diagram illustrating a configuration of an application example (electronic device) of the solid battery of the present technology.

Hereinafter, the electronic device according to the seventh embodiment of the present technology will be described with reference to FIG. 6.

An example of the configuration of an electronic device 400 according to the seventh embodiment of the present technology will be described. The electronic device 400 includes an electronic circuit 401 of an electronic device main body and a battery pack 300. The battery pack 300 is electrically connected to the electronic circuit 401 via a positive electrode terminal 331*a* and a negative electrode terminal 331*b*. For example, the electronic device 400 has a configuration that allows a user to detachably attach the battery pack 300. The configuration of the electronic device 400 is not limited thereto, and the electronic device 400 may have a configuration in which the battery pack 300 is built in the electronic device 400 so that the user cannot remove the battery pack 300 from the electronic device 400.

When charging the battery pack 300, the positive electrode terminal 331*a* and the negative electrode terminal 331*b* of the battery pack 300 are respectively connected to a positive electrode terminal and a negative electrode terminal of a charger (not illustrated). On the other hand, when discharging the battery pack 300 (when using the electronic device 400), the positive electrode terminal 331*a* and the negative electrode terminal 331*b* of the battery pack 300 are respectively connected to the positive electrode terminal and the negative electrode terminal of the electronic circuit 401.

Examples of the electronic device 400 include notebook personal computers, tablet computers, mobile phones (such as smart phones), personal digital assistants (PDA), imagers (such as digital still cameras or digital video cameras), audio devices (such as portable audio players), game devices, cordless phone handsets, e-books, electronic dictionaries, radios, headphones, navigation systems, memory cards, pacemakers, hearing aids, lighting devices, toys, medical devices, and robots, but are not limited thereto. When a head-mounted type display and a band-type electronic device are described as specific examples, the head-mounted type display is an electronic device including: an image display device; a mounting device for mounting the image display device on the head of an observer; and an attachment member for attaching the image display device to the mounting device, where the solid battery according to the first or second embodiment of the present technology is used as a driving power supply; and the band-type electronic device is an electronic device including: a plurality of segments connected in a band shape; a plurality of electronic components disposed in the plurality of segments; and a flexible circuit board which connects a plurality of electronic components in the plurality of segments and is disposed in a meandering shape in at least one segment, where, for example, the solid battery according to the first or second embodiment of the present technology as the electronic component is disposed in the segment.

The electronic circuit 401 includes, for example, a CPU, a peripheral logic unit, an interface unit, a memory unit, and controls the whole of the electronic device 400.

The battery pack 300 includes an assembled battery 301 and a charge/discharge circuit 302. The assembled battery 301 is configured by connecting a plurality of secondary batteries 301a in series and/or in parallel. The plurality of secondary batteries 301a is connected, for example, in the form of n in parallel and m in series (n and m are positive integers). In FIG. 6, an example is illustrated in which six of the secondary batteries 301a are connected in the form of two in parallel and three in series (2P3S). As the secondary battery 301a, the secondary battery according to the first embodiment or the modified example thereof is used.

The charge/discharge circuit 302 controls charging of the assembled battery 301 during charging. On the other hand, the charge/discharge circuit 302 controls discharging of the electronic device 400 during discharging (i.e., when using the electronic device 400).

EXAMPLES

Hereinafter, the effects of the present technology will be specifically described with examples. The scope of the present technology is not limited to the examples.

Experimental Method (Production of Solid Electrolyte Layer)

A crystalline electrolyte of garnet type oxide ($Li_6BaLa_2Ta_2O_{12}$) and oxide glass ($Li_2O:SiO_2:B_2O_3$=54:11:35, glass transition temperature: 380° C.) were mixed at a predetermined mass ratio (for example, in the case of a mass ratio of crystalline electrolyte of garnet type oxide:oxide glass=70:30 (volume ratio of 50:50 vol %)) so as to have the volume fraction (vol %) shown in the following Table 1, the mixture and the acrylic binder were mixed at a mass ratio of 70:30 (crystalline electrolyte of garnet type oxide+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce solid electrolyte layers used in Examples 1 to 13 and Comparative Examples 1 to 10.

(Production of Positive Electrode Layer)

Lithium cobalt oxide ($LiCoO_2$), manufactured by Sigma-Aldrich Co. LLC., and oxide glass ($Li_2O:SiO_2:B_2O_0$=54:11:35, glass transition temperature: 380° C.) were mixed at a predetermined mass ratio (for example, in the case of a mass ratio of lithium cobalt oxide:oxide glass=80:20 (volume ratio of 60:40 vol %)) so as to have the volume fraction (vol %) shown in the following Table 1, the mixture and the acrylic binder were mixed at a mass ratio of 70:30 (lithium cobalt oxide+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce positive electrode layers used in Examples 1 to 13 and Comparative Examples 1 to 10.

(Production of Negative Electrode Layer)

Spherical natural graphite and oxide glass ($Li_2O:SiO_2:B_2O_0$=54:11:35, glass transition temperature: 380° C.) were mixed at a predetermined mass ratio (for example, in the case of a mass ratio of spherical natural graphite:oxide glass=80:20 (volume ratio of 80:20 vol %)) so as to have the volume fraction (vol %) shown in the following Table 1, the mixture and the acrylic binder were mixed at a mass ratio of 70:30 (spherical natural graphite+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce negative electrode layers used in Examples 1 to 13 and Comparative Examples 1 to 10.

(Production of Current Collecting Layer)

KS6 (manufactured by TIMCAL Graphite & Carbon) and oxide glass ($Li_2O:SiO_2:B_2O_0$=54:11:35, glass transition temperature: 380° C.) were mixed at a predetermined mass ratio (for example, in the case of a mass ratio of KS6:oxide glass=70:30 (volume ratio of 70:30 vol %)) so as to have the volume fraction (vol %) shown in the following Table 1, the mixture and the acrylic binder were mixed at a mass ratio of 70:30 (KS6+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce current collecting layers used in Examples 1 to 13 and Comparative Examples 1 to 10.

(Production of Insulating Layer)

Alumina particles (AHP 300 Nippon Light Metal Company, Ltd.) and oxide glass ($Li_2O:SiO_2:B_2O_0$=54:11:35) were mixed at a predetermined mass ratio (for example, in the case of a mass ratio of alumina particles:oxide glass=75:25 (volume ratio of 60:40 vol %)) so as to have the volume fraction (vol %) shown in the following Table 1, the mixture and the acrylic binder were mixed at a mass ratio of 70:30 (alumina particles+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce Insulating layers used in Examples 1 to 13 and Comparative Examples 1 to 10.

(Production of Protective Layer)

Alumina particles (AHP 300 Nippon Light Metal Company, Ltd.) and oxide glass ($Li_2O:SiO_2:B_2O_0$=54:11:35) were mixed at a predetermined mass ratio (for example, in the case of a mass ratio of alumina particles:oxide glass=65:35 (volume ratio of 50:50 vol %)) so as to have the volume fraction (vol %) shown in the following Table 1, the mixture and the acrylic binder were mixed at a mass ratio of 70:30 (alumina particles+oxide glass):acrylic binder=70:30, and the mixture was mixed with butyl acetate so that the solid content became 30 mass %, and the mixture was stirred for 4 hours with 5 mmφ zirconia balls. This mixture was applied to mold release films and dried at 80° C. for 10 minutes to produce protective layers used in Examples 1 to 13 and Comparative Examples 1 to 10.

[Production of Solid Battery]

The solid electrolyte layer, the positive electrode layer, the negative electrode layer, the current collecting layer, the insulating layer, and the protective layer obtained in the above manner were processed into the shapes shown in FIG. 1A (insulating layers 14 and 18, protective layers 11 and 19, current collecting layers 12 and 17, a positive electrode layer 13, and a negative electrode layer 16), the layers were released from mold release films and laminated in the order of lamination shown in FIG. 1B or FIG. 1C, followed by pressure bonding at 100° C. for 10 minutes to form a laminated structure used in each of Examples 1 to 13 and Comparative Examples 1 to 10. The laminated structure may be a bipolar structure. Further, all of the electrolyte layer, the positive electrode layer, the negative electrode layer, the current collecting layer, and the insulating layer are not formed into green sheet layers, but the laminated structure may be directly formed on a certain green sheet layer by printing or the like.

After pressure bonding at 100° C. for 10 minutes, the laminated structure of the solid electrolyte layer, the positive electrode layer, the negative electrode layer, the current collecting layer, and the insulating layer was heated at 300° C. for 10 hours to remove the acrylic binder. Thereafter, the laminated structure was sintered at 400° C. for 30 minutes.

(Production of Terminal Layer)

Ag powder (DAIKEN CHEMICAL CO., LTD.) and oxide glass (ASF 1096, Bi—B glass, manufactured by AGC Inc.) were mixed at a predetermined mass ratio (for example, in the case of a mass ratio of Ag powder:oxide glass=60:40 (in the case of a volume ratio of 50:50 vol %), the mixture and the acrylic binder were mixed at a mass ratio of 70:30 (Ag powder+oxide glass):acrylic binder=70:30, and the mixture was mixed with terpineol so that the solid content became 50 mass %, and the mixture was stirred for 4 hours with 5 mmφ zirconia balls. After applying the resulting mixture to a mold release film, the exposed end face of the electrode was adhered to the laminated structure and sintered at 400° C. for 1 hour to form a terminal electrode.

A current lead was placed in the terminal layer (terminal electrode) (not illustrated) to form solid batteries (solid batteries 1 and 2) used in Examples 1 to 13 and Comparative Examples 1 to 10.

[Charge/Discharge Evaluation]

The charge/discharge evaluation was performed on each of the solid batteries produced in the above manner. The charge/discharge conditions were as follows: charge: 4.2 V, 0.1 C-CCCV, 0.01 C cut-off; discharge: 0.1 C, 2.0 V, and the discharged capacity was evaluated. Results of cell state and discharged capacity are shown in Table 1 below.

TABLE 1

| | | Volume ratio (vol %) of glass component in constituent elements except for | | | | | Maximum difference in glass ratio | Cell state | Protective layer | Terminal layer | Discharge capacity |
|---|---|---|---|---|---|---|---|---|---|---|---|
| | | Electrolyte layer | Positive electrode layer | Negative electrode layer | Current collecting layer | Insulating layer | | | | | |
| Example | 1 | 30 | 30 | 20 | 30 | 40 | 20 | Operation | 50 | 50 | 140 mAh/g per LCO |
| Example | 2 | 30 | 30 | 30 | 30 | 40 | 10 | Operation | 50 | 50 | 138 mAh/g per LCO |
| Example | 3 | 30 | 40 | 20 | 30 | 40 | 20 | Operation | 50 | 50 | 140 mAh/g per LCO |
| Example | 4 | 30 | 40 | 30 | 30 | 40 | 10 | Operation | 50 | 50 | 142 mAh/g per LCO |
| Example | 5 | 40 | 30 | 20 | 30 | 40 | 20 | Operation | 50 | 50 | 138 mAh/g per LCO |
| Example | 6 | 40 | 30 | 30 | 30 | 50 | 20 | Operation | 50 | 50 | 130 mAh/g per LCO |
| Example | 7 | 40 | 40 | 20 | 30 | 40 | 20 | Operation | 50 | 50 | 141 mAh/g per LCO |
| Example | 8 | 40 | 40 | 30 | 30 | 50 | 20 | Operation | 50 | 50 | 138 mAh/g per LCO |
| Example | 9 | 60 | 30 | 20 | 30 | 50 | 30 | Operation | 50 | 50 | 138 mAh/g per LCO |
| Example | 10 | 60 | 30 | 30 | 30 | 60 | 30 | Operation | 50 | 50 | 140 mAh/g per LCO |
| Example | 11 | 60 | 40 | 20 | 30 | 50 | 30 | Operation | 50 | 50 | 141 mAh/g per LCO |
| Example | 12 | 60 | 40 | 30 | 30 | 60 | 30 | Operation | 50 | 50 | 141 mAh/g per LCO |
| Example | 13 | 100 | 30 | 20 | 30 | 40 | 20 | Operation | 50 | 50 | 137 mAh/g per LCO |
| Comparative Example | 1 | 20 | 40 | 20 | 30 | 60 | 40 | Short circuit | 50 | 50 | — |
| Comparative Example | 2 | 20 | 50 | 10 | 30 | 50 | 40 | Short circuit | 50 | 50 | — |
| Comparative Example | 3 | 30 | 30 | 20 | 30 | 60 | 40 | Short circuit | 50 | 50 | — |
| Comparative Example | 4 | 30 | 40 | 10 | 30 | 50 | 40 | Short circuit | 50 | 50 | — |
| Comparative Example | 5 | 40 | 30 | 20 | 30 | 60 | 40 | Short circuit | 50 | 50 | — |
| Comparative Example | 6 | 40 | 40 | 10 | 30 | 50 | 40 | Short circuit | 50 | 50 | — |
| Comparative Example | 7 | 50 | 30 | 20 | 30 | 60 | 40 | Short circuit | 50 | 50 | — |
| Comparative Example | 8 | 50 | 40 | 10 | 30 | 50 | 40 | Crack | 50 | 50 | — |
| Comparative Example | 9 | 60 | 30 | 20 | 30 | 50 | 40 | Crack | 50 | 50 | — |
| Comparative Example | 10 | 60 | 40 | 10 | 30 | 50 | 60 | Crack | 50 | 50 | — |

As shown in Table 1 above, it is confirmed that when the difference in ratio of the oxide glass component among constituent elements (the solid electrolyte layer, the positive electrode layer, the negative electrode layer, the current collecting layer, and the insulating layer) is 30 vol % or less in terms of volume fraction (Examples 1 to 12), the solid battery operates stably. Further, it is confirmed that when the ratio of the oxide glass component in the solid electrolyte layer is 100 vol % in terms of volume fraction and the difference in ratio of the oxide glass component among constituent elements other than the solid electrolyte layer (the positive electrode layer, the negative electrode layer, the current collecting layer, and the insulating layer) is 30 vol % or less in terms of volume fraction (Example 13), the solid battery operates stably.

On the other hand, when the difference in the ratio of the oxide glass component among constituent elements (the solid electrolyte layer, the positive electrode layer, the negative electrode layer, the current collecting layer, and the insulating layer) was 40 vol % or more (more than 30 vol %) in terms of volume fraction, the solid battery was cracked, or a short circuit occurred during charging and discharging (particularly, during charging). It is considered that the short circuit is due to an abnormality of the internal structure of the battery which is not understood from the appearance (defect, flaws or the like).

It is confirmed that when the difference in the volume fraction of the glass material having a glass transition point of 500° C. or less among the positive electrode layer, the negative electrode layer, the current collecting layer, the solid electrolyte layer, the insulating layer, the protective layer, and the terminal layer, which form the solid battery, is 30% or less in terms of volume fraction, or when the difference in the volume fraction of the glass material having a glass transition point of 500° C. or less among the positive electrode layer, the negative electrode layer, the current collecting layer, the insulating layer, the protective layer, and the terminal layer except for the solid electrolyte layer is 30% or less, cracking and deformation during sintering can be suppressed. Further, it is confirmed that internal short-circuit during charging and discharging (particularly, charging) can be prevented.

From the results of Examples 1 to 13, it is considered that a small size and a high energy density can be realized as compared with a commercially available small lithium-ion battery.

Application Example 1: Printed Circuit Board

Figure 7:
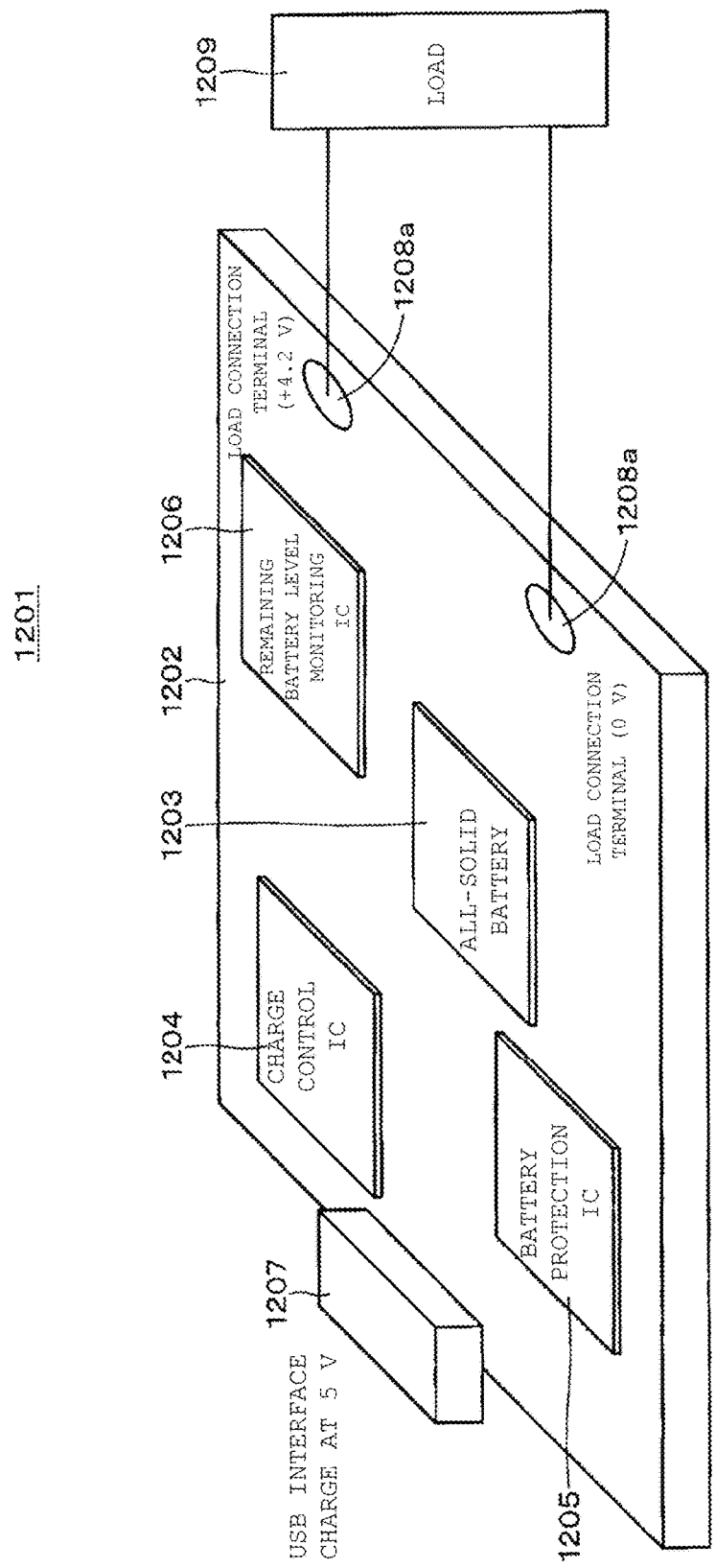
FIG. 7 is a diagram illustrating a configuration of Application Example 1 (printed circuit board) of the solid battery of the present technology.

As illustrated in FIG. 7, the solid battery described above can be mounted on a printed circuit board 1202 (hereinafter referred to as "PCB") together with a charging circuit or the like. For example, a solid battery 1203 and an electronic circuit such as the charging circuit can be mounted on the PCB 1202 in a reflow step. A battery module in which the solid battery 1203 and the electronic circuit such as the charging circuit are mounted on the PCB 1202 is referred to as a battery module 1201. The battery module 1201 is configured as a card type, if necessary, and can be configured as a portable card type mobile battery.

A charge control IC (Integrated Circuit) 1204, a battery protection IC 1205, and a remaining battery level monitoring IC 1206 are formed on the PCB 1202. The battery protection IC 1205 controls the charge/discharge operation so as to prevent an excessive increase in charging voltage during charging and discharging, an overcurrent due to a load short, and over discharge.

A USB (Universal Serial Bus) interface 1207 is attached to the PCB 1202. The solid battery 1203 is charged by electric power supplied through the USB interface 1207. In this case, the charge operation is controlled by the charge control IC 1204. Further, predetermined electric power (for example, a voltage of 4.2 V) is supplied to a load 1209, from load connection terminals 1208a and 1208b attached to the PCB 1202. The remaining battery level of the solid battery 1203 is monitored by the remaining battery level monitoring IC 1206 so that a display (not illustrated) indicative of the battery remaining level can be known from the outside. The USB interface 1207 may be used for load connection.

Specific examples of the load 1209 include the followings:

A. wearable devices (such as a sports watches, watches or hearing aids);

B. IoT terminals (such as sensor network terminals);

C. amusement devices (such as portable game terminals or game controllers);

D. IC substrate-embedded batteries (real time clock IC); and

E. environmental power generation devices (power storage elements as elements for power generation such as solar power generation, thermoelectric power generation or vibration power generation).

Application Example 2: Universal Credit Card

Currently, many people carry a plurality of credit cards. However, as the number of credit cards increases, risks such as loss and theft increase. Therefore, a card referred to as "universal credit card", in which functions of the plurality of credit cards, point cards, and the like are integrated into one card, has been put to practical use. For example, in this card, a user can capture information such as the number and expiration date of various credit cards and point cards, so if the user puts one card in user's wallet or the like, the user can select and use any card the user wants.

Figure 8:
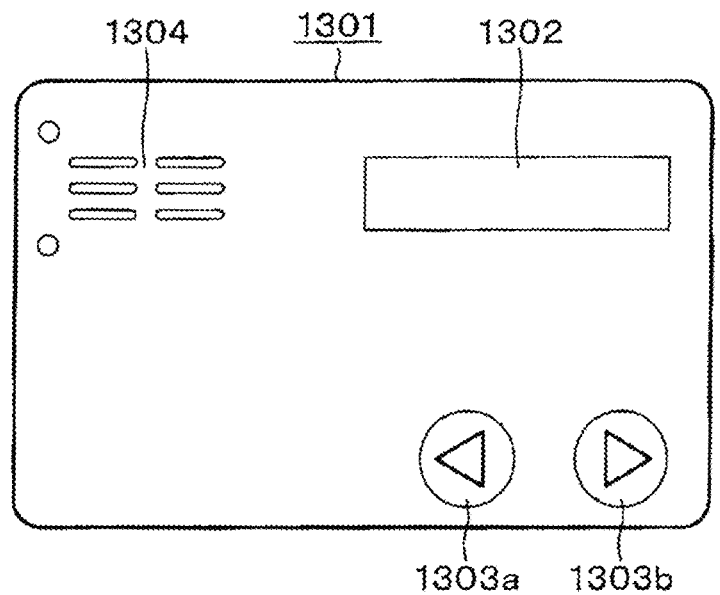
FIG. 8 is a diagram illustrating an example of a configuration of Application Example 2 (universal credit card) of the solid battery according to the present technology.

FIG. 8 illustrates an example of a configuration of a universal credit card 1301. The universal credit card has a card type shape, and an IC chip and the solid battery according to the present technology (not illustrated) are built therein. Further, a display 1302 with low power consumption and operation units such as direction keys 1303a and 1303b are provided on the universal credit card. Furthermore, a charging terminal 1304 is provided on the surface of the universal credit card 1301.

For example, the user operates the direction keys 1303a and 1303b while viewing the display 1302 and thus the user can specify a credit card or the like loaded in the universal credit card 1301 in advance. When the plurality of credit cards is loaded in advance, information indicating each of the credit cards is displayed on the display 1302, and the user can designate a desired credit card by operating the direction keys 1303a and 1303b. After that, the user can use the credit card, like a conventional credit card. This is just an example, and it goes without saying that the solid battery according to the present technology can be applied to any electronic cards other than the universal credit card 1301.

Application Example 3: Wristband-type Electronic Device

An example of a wearable terminal is a wristband-type electronic device. Among the wristband-type electronic devices, the wristband-type activity meter, also referred to as "smartband", can acquire data on human activities such as step count, moving distance, calorie consumption, amount of sleep, and heart rate only by wrapping around the arm. Further, the acquired data can be controlled by a smart phone. Further, the wristband-type activity meter can include a mail sending/receiving function, and for example, a wristband-type activity meter having a notifying function of notifying the user of e-mail reception by an LED (Light Emitting Diode) lamp and/or vibration has been used.

Figure 9:
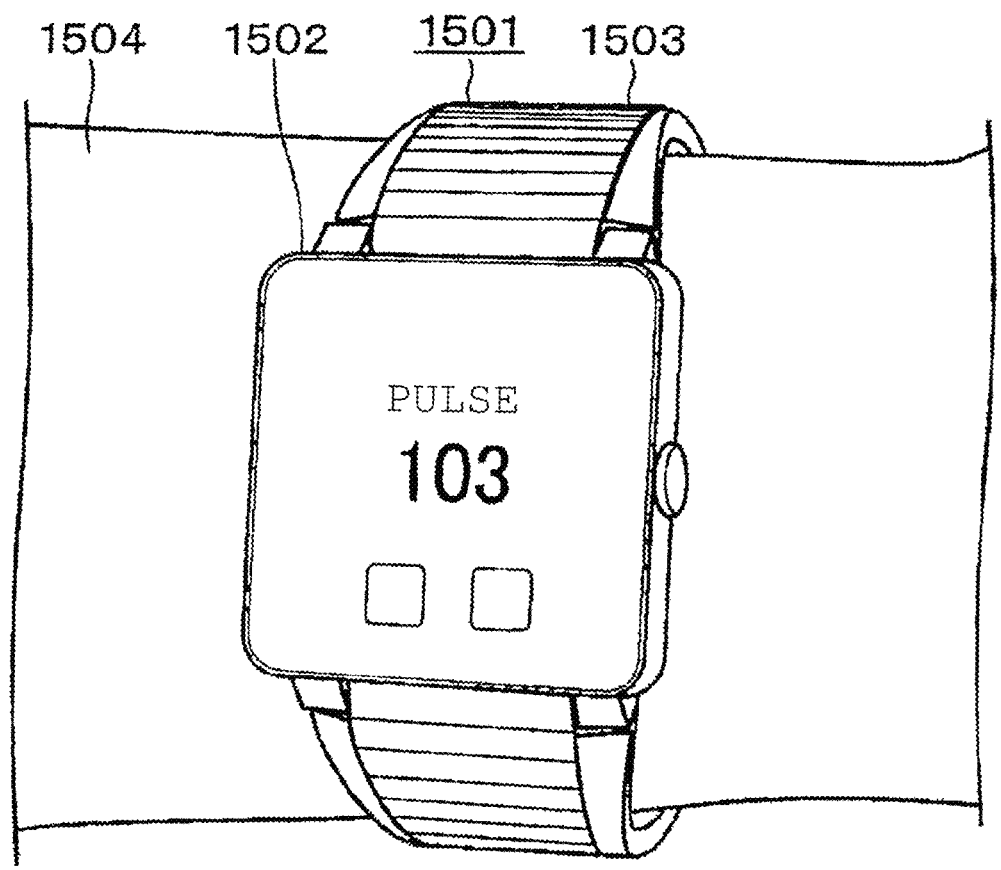
FIG. 9 is a diagram illustrating an example of a configuration of Application Example 3 (wristband-type activity meter) of the solid battery according to the present technology.
Figure 10:
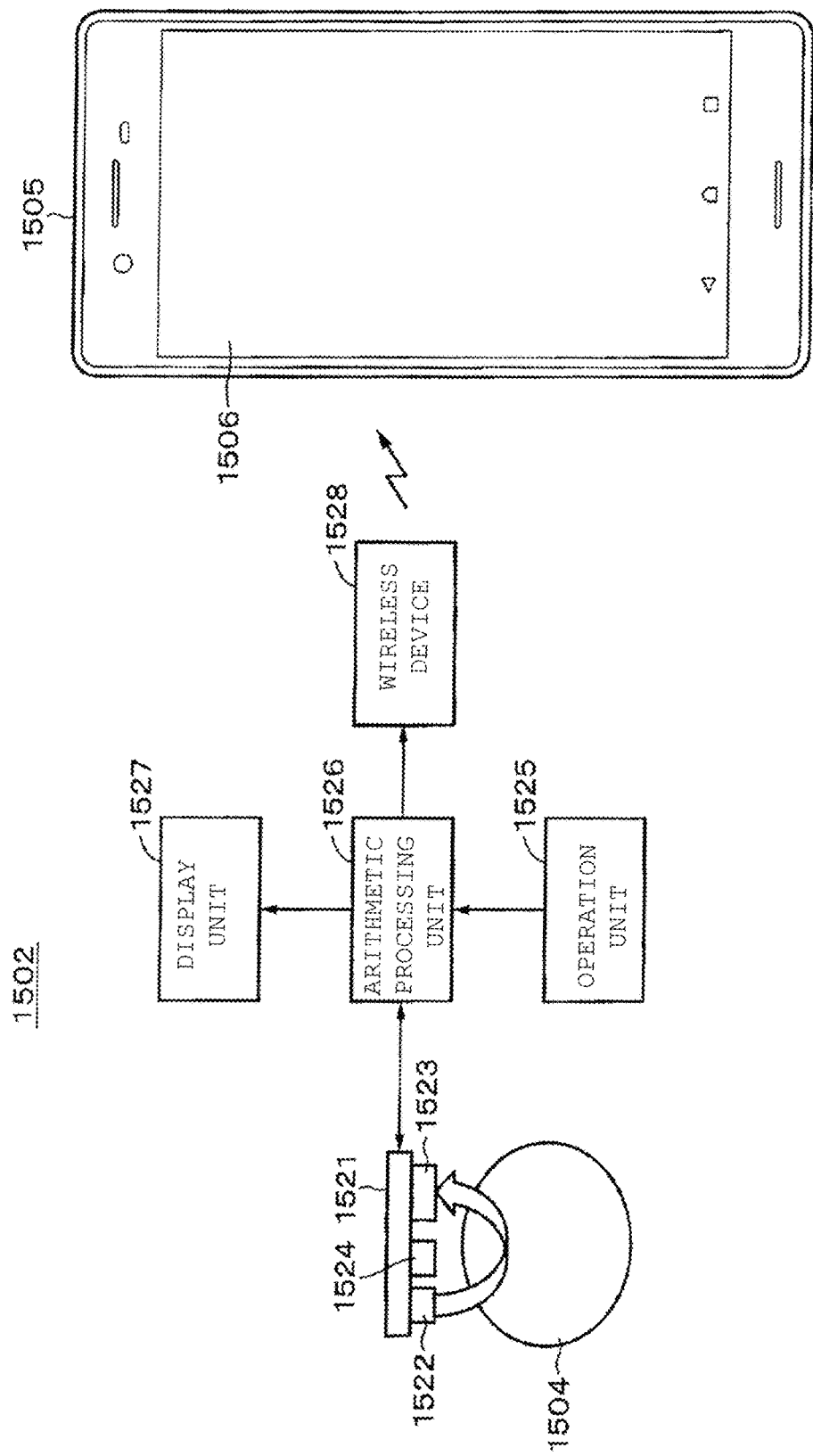
FIG. 10 is a diagram illustrating an example of a configuration of Application Example 3 (wristband-type activity meter) of the solid battery according to the present technology.

FIGS. 9 and 10 illustrate an example of the wristband-type activity meter that measures, for example, a pulse. FIG. 9 illustrates a configuration example of an appearance of a wristband-type activity meter 1501. FIG. 10 illustrates a configuration example of a main body portion 1502 of the wristband-type activity meter 1501.

The wristband-type activity meter 1501 is a wristband-type measurement device that measures, for example, a pulse of a subject by an optical method. As illustrated in FIG. 9, the wristband-type activity meter 1501 includes the main body portion 1502 and a band 1503, and the band 1503 is attached to an arm (a wrist) 1504 of the subject like a wristwatch. Then, the main body portion 1502 irradiates the portion including the pulse of the arm 1504 of the subject with measurement light of a predetermined wavelength, and measures the pulse of the subject based on the intensity of returned light.

The main body portion 1502 is configured to include a substrate 1521, an LED 1522, a light receiving IC 1523, a light shield 1524, an operation unit 1525, an arithmetic processing unit 1526, a display unit 1527, and a wireless device 1528. The LED 1522, the light receiving IC 1523, and the light shield 1524 are provided on the substrate 1521. Under the control of the light receiving IC 1523, the LED 1522 irradiates the portion including the pulse of the arm 1504 of the subject with measurement light of a predetermined wavelength.

The light receiving IC 1523 receives the light returned after the arm 1504 is irradiated with the measurement light. The light receiving IC 1523 generates a digital measurement signal indicating the intensity of the returned light and supplies the generated measurement signal to the arithmetic processing unit 1526.

The light shield 1524 is provided between the LED 1522 and the light receiving IC 1523 on the substrate 1521. The light shield 1524 prevents direct entrance of the measurement light from the LED 1522 into the light receiving IC 1523.

The operation unit 1525 is formed with various operation members such as buttons and switches, and is provided, for example, on a surface or the like of the main body portion 1502. The operation unit 1525 is used in operating the wristband-type activity meter 1501 and supplies a signal indicating the contents of operation to the arithmetic processing unit 1526.

The arithmetic processing unit 1526 performs arithmetic processing to measure the pulse of the subject, based on the measurement signal supplied from the light receiving IC 1523. The arithmetic processing unit 1526 supplies a result of the pulse measurement to the display unit 1527 and the wireless device 1528.

The display unit 1527 is formed with a display device such as an LCD (Liquid Crystal Display), and is provided, for example, on a surface of the main body portion 1502. The display unit 1527 displays the result of the measurement of the subject's pulse and the like.

The wireless device 1528 transmits the result of the measurement of the subject's pulse to an external device through wireless communication by a predetermined method. For example, as illustrated in FIG. 10, the wireless device 1528 transmits the result of the measurement of the subject's pulse to a smart phone 1505, and causes a screen 1506 of the smart phone 1505 to display the measurement result. Further, the data of the measurement result is controlled by the smart phone 1505, and the measurement result can be viewed with the smart phone 1505 or can be stored in a server on the network. Any communication method can be used in the wireless device 1528. The light receiving IC 1523 can also be used to measure a pulse at a site other than the arm 1504 of the subject (e.g., a finger or an earlobe).

The wristband-type activity meter 1501 can accurately measure the pulse wave and pulse of the subject by removing the influence of body motion by signal processing in the light receiving IC 1523. For example, even if the subject does vigorous exercise such as running, it is possible to accurately measure the pulse wave and pulse of the subject. Further, for example, in the case where the measurement is performed on the subject while wearing the wristband-type activity meter 1501 for a long time, it is possible to continue to measure the pulse wave and the pulse accurately by removing the influence of the body motion of the subject.

Further, the amount of calculation is reduced, so that the consumed power of the wristband-type activity meter 1501 can be reduced. As a result, it is possible to perform the measurement on the subject while wearing the wristband-type activity meter 1501 for a long time, without, for example, charging or replacing the battery.

As a power supply, for example, a thin battery is housed in the band 1503. The wristband-type activity meter 1501 includes an electronic circuit of the main body and a battery pack. For example, it is configured such that a user detachably attaches the battery pack. The electronic circuit is a circuit included in the main body portion 1502. The present technology can be applied to the case where all-solid batteries are used as batteries.

Figure 11:
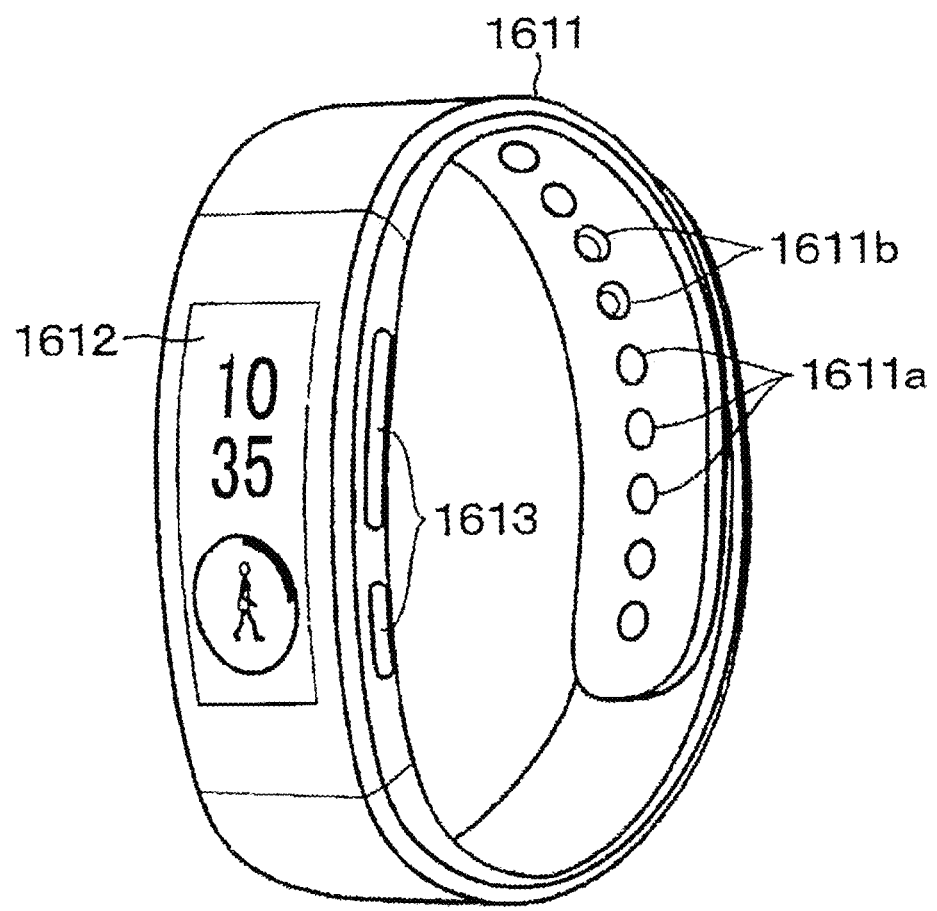
FIG. 11 is a diagram illustrating a configuration of Application Example 3 (wristband-type electronic device) of the solid battery according to the present technology.

FIG. 11 illustrates a configuration example of an appearance of a wristband-type electronic device 1601 (hereinafter simply referred to as "electronic device 1601").

The electronic device 1601 is, for example, a so-called watch-type wearable device which is detachably attached to a human body. The electronic device 1601 includes, for example, a band portion 1611 which is attached to an arm, a display device 1612 which displays numbers, letters, symbols, and the like, and operation buttons 1613. The band portion 1611 includes a plurality of hole portions 1611a and protrusions 1611b formed on the side of the inner peripheral surface (the surface in contact with the arm when the electronic device 1601 is attached).

In the usage state, the electronic device 1601 is bent so that the band portion 1611 has a substantially circular shape as illustrated in FIG. 11, and the protrusions 1611b are inserted into the hole portions 1611a and attached to the arm. The positions of the hole portions 1611a into which the protrusions 1611b are inserted are adjusted, whereby it is possible to adjust the size of the diameter depending on the thickness of the arm. When the electronic device 1601 is not in use, the protrusions 1611b are removed from the hole portions 1611a, and the band portion 1611 is stored in a substantially flat state. The sensor according to an embodiment of the present technology is provided, for example, over the whole of the band portion 1611.

Application Example 4: Smartwatch

A smartwatch has an appearance similar or analogous to the design of an existing watch and is used by wearing it on the user's arm like a wristwatch, and has a function of notifying the user of various messages such as incoming call and e-mail reception based on information displayed on the display. Further, there has been proposed a smartwatch having an electronic money function, an activity meter function or the like. In the smartwatch, the display is incorporated in the surface of the main body portion of the electronic device, and various information is displayed on the display. Further, the smartwatch performs short-range wireless communication such as Bluetooth (registered trademark) with a communication terminal (a smart phone or the like) so as to cooperate with functions, contents, and the like of the communication terminal or the like.

There has been proposed a smartwatch including: a plurality of segments connected in a band shape; a plurality of electronic components disposed in the plurality of segments; and a flexible circuit board which connects the plurality of electronic components in the plurality of segments and is disposed in a meandering shape in at least one of the segments. The flexible circuit board has the meandering shape, whereby no stress is applied to the flexible circuit board even if the band is bent, and the cutting of the circuit is prevented. Further, electronic circuit components can be built in the segment at the side of the band attached to the main body of the watch (not to the housing constituting the main body of the watch), and it is not necessary to modify the main body side of the watch, and thus it is possible to form a smartwatch having the same design as that of the conventional watch. Further, the smartwatch of this application example can notify the user of "e-mail reception", "incoming call" or the like, can log a user's action history, and can allow the user to make a voice call. Furthermore, the smartwatch has a function as a non-contact type IC card, and can perform settlement, authentication or the like in a non-contact manner.

The smartwatch of this application example incorporates circuit components for performing communication processing or notification processing in a metal band. In order to allow the metal band to function as an electronic device while reducing the thickness of the metal band, the band has a configuration in which a plurality of segments is connected, and each of the segments includes a circuit board, a vibration motor, a battery, and an acceleration sensor. Components such as the circuit board, the vibration motor, the battery, and the acceleration sensor in each of the segments are connected by a flexible printed circuit board (FPC).

Figure 12:
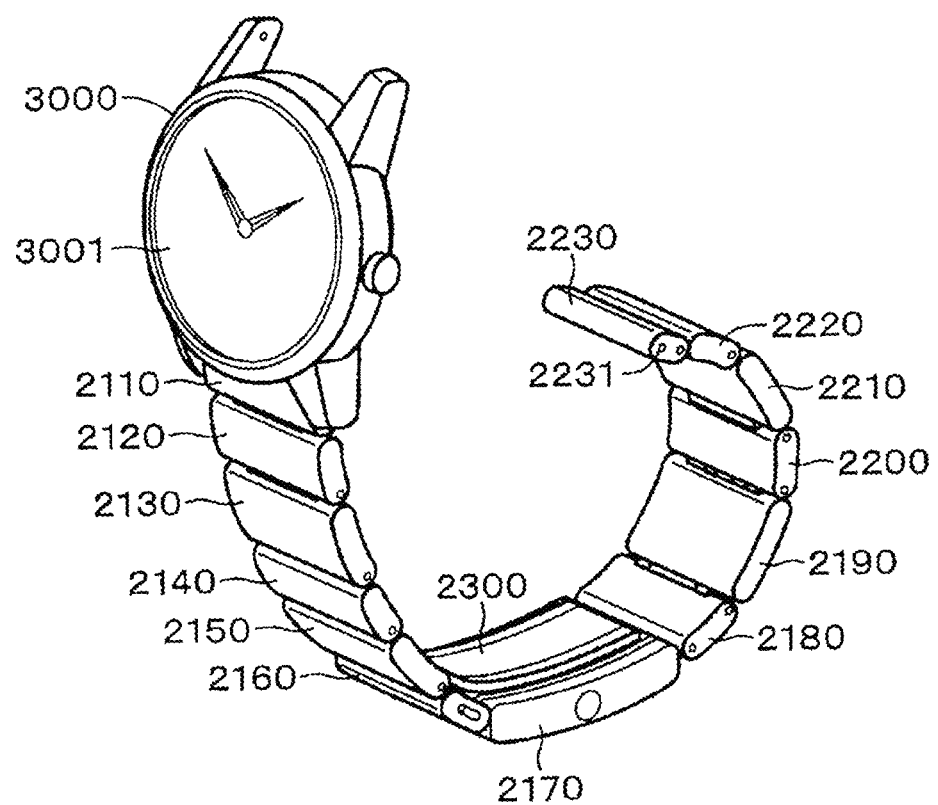
FIG. 12 is an exploded perspective view illustrating a configuration of Application Example 4 (smartwatch) of the solid battery according to the present technology.

FIG. 12 illustrates the overall configuration (exploded perspective view) of the smartwatch. A band-type electronic device 2000 is a metal band attached to a timepiece main body 3000 and is attached to the user's arm. The timepiece main body 3000 includes a dial face 3100 that displays the time. The timepiece main body 3000 may electronically display the time on a liquid crystal display or the like, in place of the dial face 3100.

The band-type electronic device 2000 has a configuration in which a plurality of segments 2110 to 2230 are connected. The segment 2110 is attached to one band attachment hole of the timepiece main body 3000 and the segment 2230 is attached to the other band attachment hole of the timepiece main body 3000. In this example, each of the segments 2110 to 2230 is made of metal.

(Outline of Insides of Segments)

Figure 13:
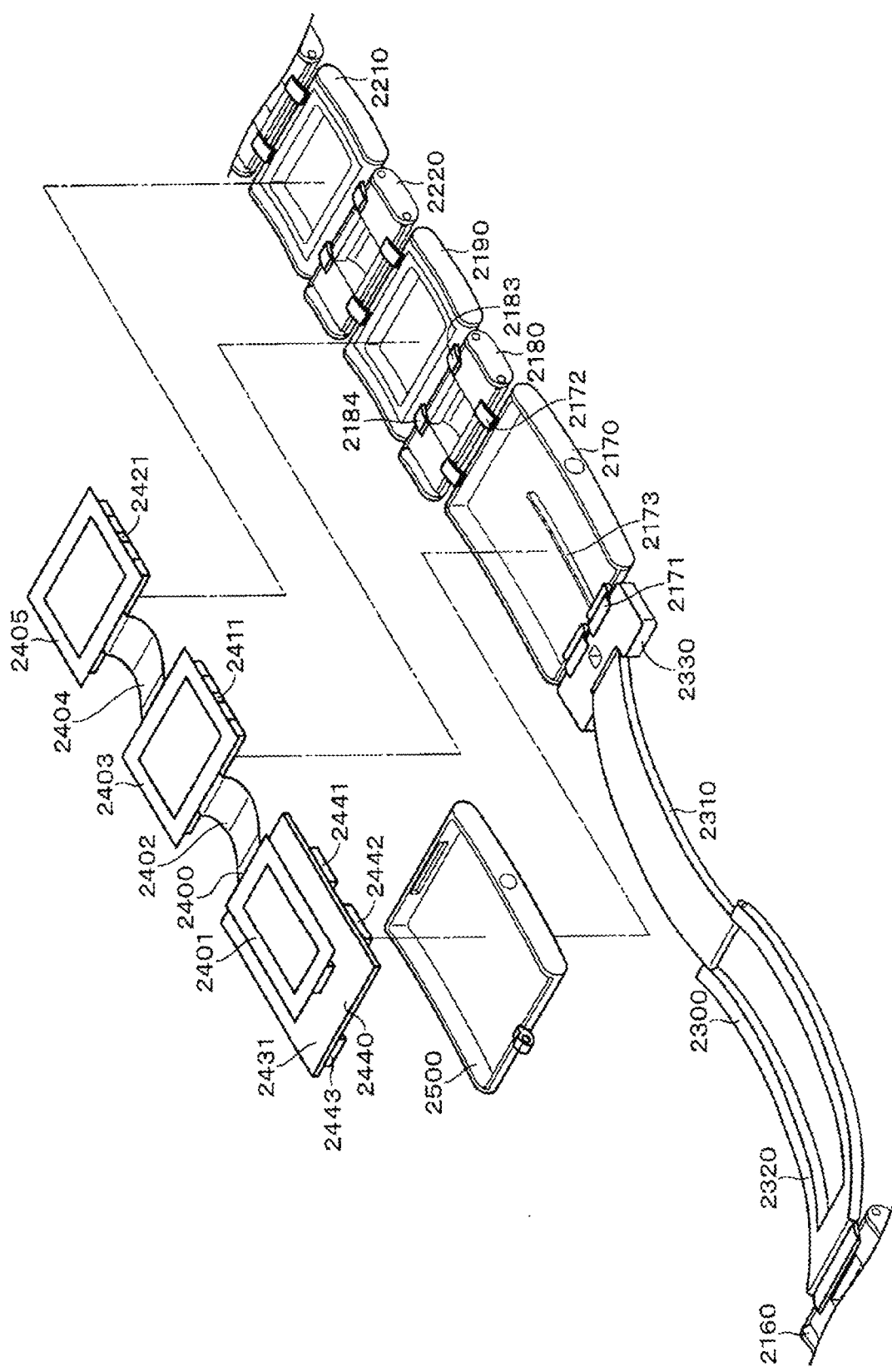
FIG. 13 is a diagram illustrating a part of an internal configuration of Application Example 4 (band-type electronic device) of the solid battery according to the present technology.

FIG. 13 illustrates a part of the internal configuration of the band-type electronic device 2000. For example, the insides of the three segments 2170, 2180, and 2190, the segment 2200, and the segment 2210 are illustrated. In the band-type electronic device 2000, flexible circuit boards 2400 are disposed in five consecutive segments 2170 to 2210. Various electronic components are disposed in the segment 2170, batteries 2411 and 2421 according to the present technology are disposed in the segments 2190 and 2210, and these components are electrically connected by the flexible circuit boards 2400. The segment 2180 between the segment 2170 and the segment 2190 has a relatively small size, and the flexible circuit board 2400 in a meandering form is disposed thereon. In the segment 2180, the flexible circuit board 2400 is disposed in a state sandwiched between waterproof members. The inside of each of the segments 2170 to 2210 has a waterproof structure.

(Configuration of Circuit of Smartwatch)

Figure 14:
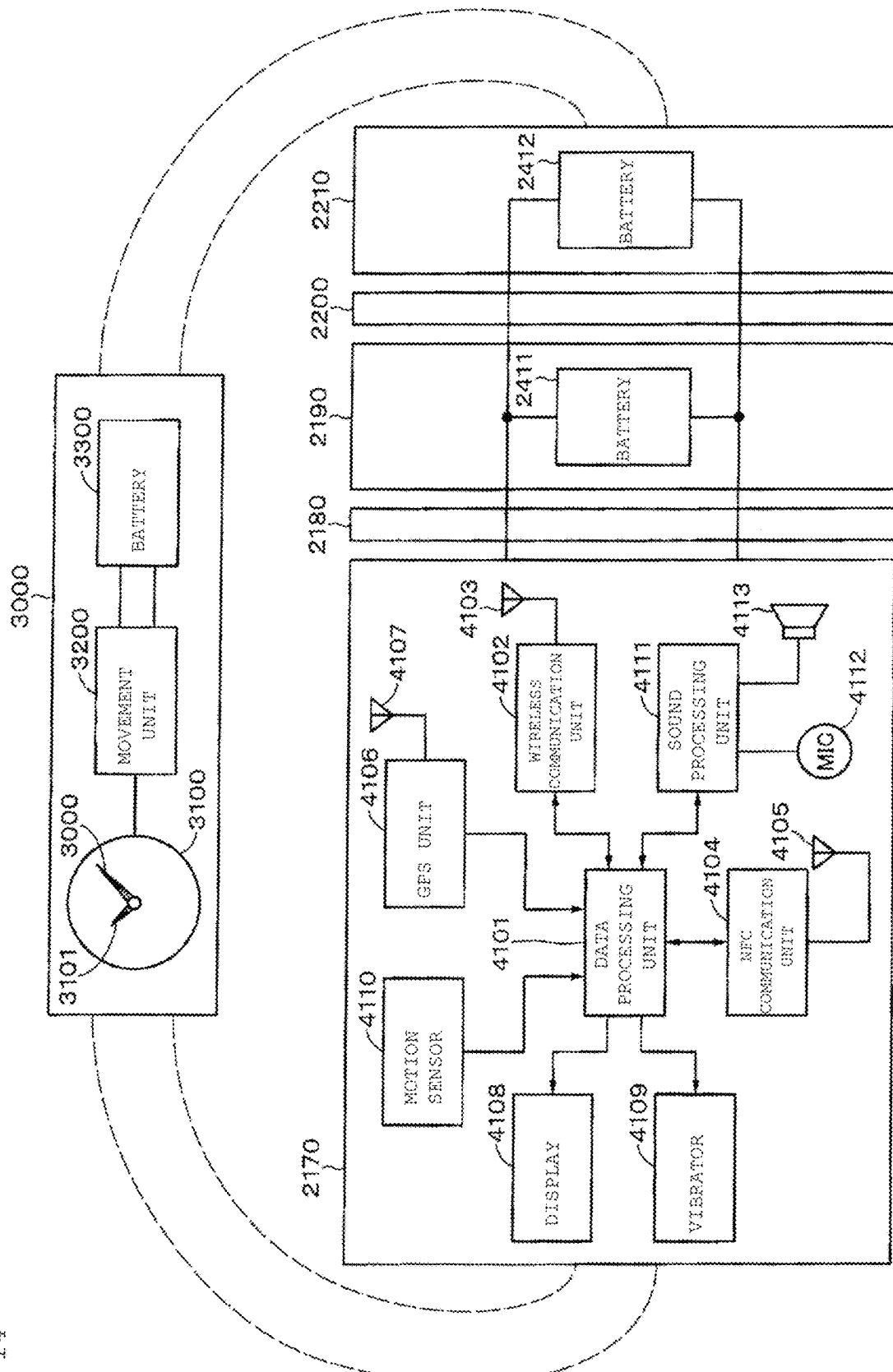
FIG. 14 is a block diagram illustrating a circuit configuration of Application Example 4 (band-type electronic device) of the solid battery according to the present technology.

FIG. 14 is a block diagram illustrating a circuit configuration of the band-type electronic device 2000. The circuit inside the band-type electronic device 2000 has a configuration independent of the timepiece main body 3000. The timepiece main body 3000 includes a movement unit 3200 that rotates hands disposed on the dial face 3100. A battery 3300 is connected to the movement unit 3200. The movement unit 3200 and the battery 3300 are built in the housing of the timepiece main body 3000.

In the band-type electronic device 2000 connected to the timepiece main body 3000, electronic components are disposed in three segments 2170, 2190, and 2210. A data processing unit 4101, a wireless communication unit 4102, an NFC communication unit 4104, and a GPS unit 4106 are disposed in the segment 2170. Antennas 4103, 4105, and 4107 are connected to the wireless communication unit 4102, the NFC communication unit 4104, and the GPS unit 4106, respectively. Each of the antennas 4103, 4105, 4107 is disposed in the vicinity of a slit 2173 (to be described later) in the segment 2170.

The wireless communication unit 4102 performs short-range wireless communication with other terminals according to, for example, the Bluetooth (registered trademark) standard. The NFC communication unit 4104 performs wireless communication with a close reader/writer according to the NFC standard. The GPS unit 4106 is a positioning unit that receives a radio wave from a satellite of a system called GPS (Global Positioning System) and performs positioning of the current position. The data obtained from the wireless communication unit 4102, the NFC communication unit 4104, and the GPS unit 4106 is supplied to the data processing unit 4101.

Further, a display 4108, a vibrator 4109, a motion sensor 4110, and a sound processing unit 4111 are disposed in the segment 2170. The display 4108 and the vibrator 4109 function as a notification unit for giving a wearer of the band-type electronic device 2000 notice. The display 4108 is made of a plurality of light emitting diodes, and gives the user notice by turning on or blinking the light emitting diodes. The plurality of light emitting diodes is disposed in, for example, the slit 2173 (to be described later) of the segment 2170, and "incoming call", "e-mail reception" or the like is notified by turning on or blinking the light emitting diodes. A display type that displays letters, numbers or the like may be used as the display 4108. The vibrator 4109 is a member that vibrates the segment 2170. The band-type electronic device 2000 notifies the user of "incoming call", "e-mail reception" or the like by vibrating the segment 2170 by the vibrator 4109.

The motion sensor 4110 detects the movement of the user who wears the band-type electronic device 2000. As the motion sensor 4110, an acceleration sensor, a gyro sensor, an electronic compass, an atmospheric pressure sensor, or the like is used. Further, sensors other than the motion sensor 4110 may be built in the segment 2170. For example, a biosensor which detects a pulse or the like of the user wearing the band-type electronic device 2000 may be built therein. A microphone 4112 and a speaker 4113 are connected to the sound processing unit 4111, and the sound processing unit 4111 performs processing of a call with another user connected by wireless communication in the wireless communication unit 4102. Further, the sound processing unit 4111 can also perform processing for sound input operation.

The battery 2411 is built in the segment 2190, and the battery 2421 is built in the segment 2210. The batteries 2411 and 2421 can be constituted by the solid battery according to the present technology, and supply a driving power supply to circuits in the segment 2170. The circuits in the segment 2170 and the batteries 2411 and 2421 are connected by the flexible circuit board 2400 (FIG. 13). Although not illustrated in FIG. 14, the segment 2170 includes terminals for charging the batteries 2411 and 2421. Electronic components other than the batteries 2411 and 2421 may be disposed in the segments 2190 and 2210. For example, the segments 2190 and 2210 may be configured to include a circuit that controls the charge/discharge of the batteries 2411 and 2421.

Application Example 5: Eyeglass-type Terminal

In an eyeglass-type terminal described below, information such as text, symbols or images can be superimposed and displayed on the landscape in front of the eyes. That is, a lightweight and thin image display device display module dedicated to the transmissive eyeglass-type terminal is mounted. Typically, there is a head-mounted type display (a head mounted display (HMD)).

The image display device includes an optical engine and a hologram light guide plate. The optical engine emits image light such as images and text through a microdisplay lens. This image light enters the hologram light guide plate. The hologram light guide plate is one in which hologram optical elements are incorporated at both ends of a transparent plate, and the image light from the optical engine is propagated through a very thin transparent plate (such as 1 mm in thickness) and delivered to the eyes of an observer. Such a configuration realizes a lens having a thickness of 3 mm (including protective plates on the front and back of the light guide plate) and having a transmittance of, for example, 85%. The eyeglass-type terminal enables a user to view the results of the players and teams in real time while watching sports, or to display the sightseeing information while traveling.

Figure 15:
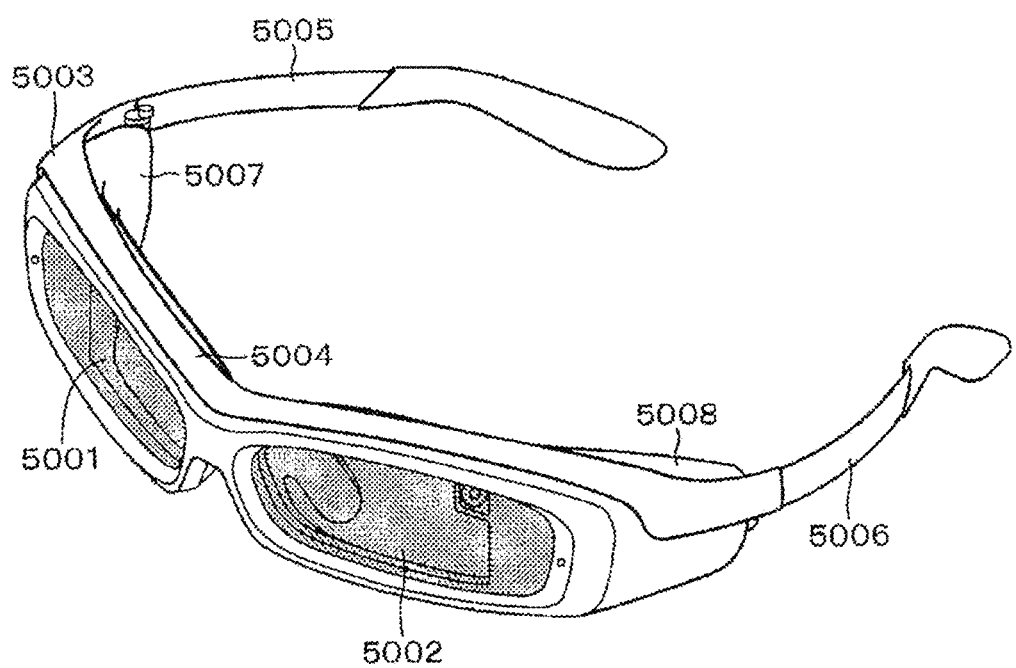
FIG. 15 is a diagram illustrating a specific example of a configuration of Application Example 5 (eyeglasses-type terminal) of the solid battery according to the present technology.

In a specific example of the eyeglass-type terminal, image display units have an eyeglass-type configuration as illustrated in FIG. 15. Similarly to usual eyeglasses, the terminal has a frame 5003 for holding a right image display unit 5001 and a left image display unit 5002 in front of the eyes. The frame 5003 includes a front portion 5004 which is disposed on the front of the observer and two temple portions 5005 and 5006 which are pivotally attached to both ends of the front portion 5004 via hinges. The frame 5003 is made of the same material as the material constituting usual eyeglasses, such as a metal, an alloy, plastic, and a combination thereof. A headphone portion may be provided.

The right image display unit 5001 and the left image display unit 5002 are disposed so as to be positioned in front of the user's right eye and the user's left eye, respectively. The temple portions 5005 and 5006 hold the image display units 5001 and 5002 on the user's head. A right display driving unit 5007 is disposed inside the temple portion 5005 at a connection portion between the front portion 5004 and the temple portion 5005. A left display driving unit 5008 is disposed inside the temple portion 5006 at a connection portion between the front portion 5004 and the temple portion 5006.

Although not illustrated in FIG. 15, the solid battery according to the present technology, an acceleration sensor, a gyroscope, an electronic compass, a microphone-speaker, and the like are mounted on the frame 5003. Further, an imager is attached to the frame, and thus it is possible to shoot a still image and a moving image. Furthermore, the frame includes a controller that is connected to the eyeglass portion via, for example, a wireless or wired interface. The controller is provided with a touch sensor, various buttons, a speaker, a microphone, and the like. Further, the controller has a link function with the smart phone. For example, it is possible to utilize the GPS function of the smart phone to provide information according to the user's situation.

The present technology is not limited to the embodiments, the examples, and the application examples, and can be modified within a range not departing from the gist of the present technology.

Since the effect of the present technology can be obtained without depending on the type of electrode reactant as long as the electrode reactant is an electrode reactant used for the solid battery, the same effect can be obtained even if the type of the electrode reactant is changed. Further, the chemical formulae of the compounds and the like are representative, and a generic name of a compound is not limited by the valences or the like.

DESCRIPTION OF REFERENCE SYMBOLS 1, 2: Solid battery
14, 18: Insulating layer
11, 19: Protective layer
12, 17: Current collecting layer
13: Positive electrode layer
16: Negative electrode layer

The invention claimed is:
1. A solid battery comprising:
a positive electrode layer;
a negative electrode layer;
a current collecting layer associated with at least one of the positive electrode layer and the negative electrode layer;
a solid electrolyte layer between the positive electrode layer and the negative electrode layer; and
an insulating layer on a side of the current collecting layer,
wherein the solid electrolyte layer is made of a first material having a glass transition point of 500° C. or less,
each of the positive electrode layer, the negative electrode layer, the current collecting layer, and the insulating layer contains a second material having a glass transition point of 500° C. or less in an amount of 10 vol % to 60 vol %, and
among contents of the second material in each of the positive electrode layer, the negative electrode layer, the current collecting layer, and the insulating layer, a difference between a maximum content and a minimum content is 30 vol % or less.
2. The solid battery according to claim 1, wherein the first material and the second material have an ionic conductivity of $10^{-7}$ S/cm or more.

3. The solid battery according to claim 1, further comprising a protective layer, wherein the protective layer contains a third material having a glass transition point of 500° C. or less.

4. The solid battery according to claim 1, further comprising a terminal layer, wherein the terminal layer contains a third material having a glass transition point of 500° C. or less.

5. A battery pack comprising:
the solid battery according to claim 1;
a control unit which controls a usage state of the solid battery; and
a switch unit which switches the usage state of the solid battery in response to an instruction from the control unit.

6. A vehicle comprising:
the solid battery according to claim 1;
a driving force converting device which receives a supply of electric power from the solid battery and converts the electric power into a driving force of the vehicle;
a driving unit which drives in response to the driving force; and
a vehicle control device.

7. A power storage system comprising:
a power storage device including the solid battery according to claim 1;
a power consumption device to which electric power is supplied from the solid battery;
a control device which controls electric power supply from the solid battery to the power consumption device; and
a power generation device which charges the solid battery.

8. A power tool comprising:
the solid battery according to claim 1; and
a movable part to which electric power is supplied from the solid battery.

9. An electronic device comprising the solid battery according to claim 1, the electronic device being configured to receive a supply of electric power from the solid battery.

* * * * *